(12) United States Patent
Tashiro et al.

(10) Patent No.: US 11,370,439 B2
(45) Date of Patent: Jun. 28, 2022

(54) VEHICLE TRAVEL CONTROL DEVICE, AND VEHICLE TRAVEL CONTROL SYSTEM

(71) Applicant: HITACHI AUTOMOTIVE SYSTEMS, LTD., Ibaraki (JP)

(72) Inventors: Naoyuki Tashiro, Hitachinaka (JP); Takashi Okada, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 332 days.

(21) Appl. No.: 16/482,144

(22) PCT Filed: Feb. 5, 2018

(86) PCT No.: PCT/JP2018/003741
§ 371 (c)(1),
(2) Date: Jul. 30, 2019

(87) PCT Pub. No.: WO2018/147207
PCT Pub. Date: Aug. 16, 2018

(65) Prior Publication Data
US 2020/0001878 A1    Jan. 2, 2020

(30) Foreign Application Priority Data

Feb. 13, 2017  (JP) .............................. JP2017-023725

(51) Int. Cl.
*B60W 30/18* (2012.01)
*B60W 10/04* (2006.01)
(Continued)

(52) U.S. Cl.
CPC ...... *B60W 30/18163* (2013.01); *B60W 10/04* (2013.01); *B60W 10/20* (2013.01);
(Continued)

(58) Field of Classification Search
CPC .......... B60W 30/18163; B60W 10/04; B60W 10/20; B60W 50/14; B60W 2554/4041;
(Continued)

(56) References Cited

U.S. PATENT DOCUMENTS 6,401,024 B1 * 6/2002 Tange ................ B60K 31/0008
180/170
9,495,874 B1   11/2016 Zhu et al.
(Continued)

FOREIGN PATENT DOCUMENTS

CN   103003121 B  *  3/2016  ............. F16H 59/48
JP   2006-184005 A   7/2006
(Continued)

OTHER PUBLICATIONS

Zhongyue et al., "Research and Comparison for Acceleration and Deceleration Control Algorithm in NC Systems," 2011, vol. 1, Publisher: IEEE.*
(Continued)

*Primary Examiner* — Tuan C To
(74) *Attorney, Agent, or Firm* — Volpe Koenig

(57) ABSTRACT

Provided and disclosed herein is a vehicle travel control device capable of improving fuel consumption performance of a host vehicle by, in response to receiving vehicle information indicating a deceleration cause has occurred ahead of the host vehicle, rapidly stopping or suppressing the generation of a driving force by the host vehicle.

8 Claims, 15 Drawing Sheets

(51) Int. Cl.
*B60W 50/14* (2020.01)
*B60W 10/20* (2006.01)

(52) U.S. Cl.
CPC ......... *B60W 50/14* (2013.01); *B60W 2520/10* (2013.01); *B60W 2554/4041* (2020.02); *B60W 2556/45* (2020.02); *B60W 2710/20* (2013.01); *B60W 2720/106* (2013.01)

(58) Field of Classification Search
CPC ......... B60W 2556/45; B60W 2520/10; B60W 2710/20; B60W 2720/106
USPC .......................................................... 701/70
See application file for complete search history.

(56) References Cited

U.S. PATENT DOCUMENTS

| | | | | |
|---|---|---|---|---|
| 9,669,808 | B2* | 6/2017 | Abe | B60W 10/188 |
| 10,220,837 | B2* | 3/2019 | Takahara | B60W 30/02 |
| 2007/0255462 | A1* | 11/2007 | Masuda | F02D 11/105 |
| | | | | 701/1 |
| 2008/0162012 | A1* | 7/2008 | Masuda | F02D 11/105 |
| | | | | 701/101 |
| 2010/0256852 | A1* | 10/2010 | Mudalige | G08G 1/164 |
| | | | | 701/24 |
| 2010/0274424 | A1* | 10/2010 | Oe | B60W 10/08 |
| | | | | 701/22 |
| 2012/0078484 | A1* | 3/2012 | Kato | B60W 30/143 |
| | | | | 701/96 |
| 2012/0083960 | A1 | 4/2012 | Zhu et al. | |
| 2012/0185136 | A1* | 7/2012 | Ohnuma | B60W 30/04 |
| | | | | 701/48 |
| 2013/0297172 | A1* | 11/2013 | Ariga | B60W 30/16 |
| | | | | 701/70 |
| 2016/0091896 | A1* | 3/2016 | Maruyama | B60W 50/10 |
| | | | | 701/23 |
| 2016/0137197 | A1* | 5/2016 | Hayakawa | B60K 28/10 |
| | | | | 701/70 |
| 2017/0036679 | A1* | 2/2017 | Takeda | G05D 1/0289 |
| 2017/0240109 | A1* | 8/2017 | Kimura | G02B 27/0101 |
| 2017/0240176 | A1* | 8/2017 | Aoki | B60W 40/04 |
| 2017/0287331 | A1* | 10/2017 | Laur | B62D 15/0285 |
| 2018/0056999 | A1* | 3/2018 | Damiani | G01S 13/931 |
| 2018/0151066 | A1* | 5/2018 | Oba | G05D 1/0088 |
| 2018/0201272 | A1* | 7/2018 | Takeda | B60W 30/10 |
| 2018/0297594 | A1* | 10/2018 | Takahashi | B60W 10/20 |
| 2018/0354500 | A1* | 12/2018 | Iwashita | B60W 10/08 |

FOREIGN PATENT DOCUMENTS

| | | | | |
|---|---|---|---|---|
| JP | 2006-277546 A | | 10/2006 | |
| JP | 2007-193475 A | | 8/2007 | |
| JP | 2009-113763 A | | 5/2009 | |
| JP | 2013-544696 A | | 12/2013 | |
| JP | 2014-108643 A | | 6/2014 | |
| JP | WO2013190652 A1 * | | 2/2016 | ............ B60W 10/02 |
| JP | 2016130042 A * | | 7/2016 | |
| JP | 2016210222 A * | | 12/2016 | |
| WO | 2014/155884 A1 | | 10/2014 | |
| WO | WO-2016079614 A1 * | | 5/2016 | ............. B62K 3/002 |

OTHER PUBLICATIONS

Shingo et al., "Range Extension Control System for Electric Vehicles during Acceleration and Deceleration Based on Front and Rear Driving-Braking Force Distribution Considering Slip Ratio and Motor Loss," 2013, Publisher: IEEE.*

International Search Report dated Jun. 5, 2018 for the PCT International Application No. PCT/JP2018/003741.

* cited by examiner

DECELERATION CAUSE OF HOST VEHICLE IS DETECTED
(DECELERATION CAUSE: LEFT TURN DECELERATION OF HOST VEHICLE)

DECELERATION CAUSE OF OTHER THAN HOST VEHICLE IS DETECTED
(DECELERATION CAUSE: LEFT TURN DECELERATION OF OTHER VEHICLE A)

| TRAVELING LANE OF HOST VEHICLE | PLANNED ROUTE | LANE WHERE DECELERATION CAUSE OCCURS (FIRST LANE, SECOND LANE) | RECOMMENDATION DETERMINATION OF LANE CHANGE |
|---|---|---|---|
| 1 | STRAIGHT AHEAD | (1, *) | ○ (TO SECOND LANE) |
| | | (*, 1) | — |
| | | (1, 1) | — |
| | TURNING RIGHT | (1, *) | ○ (TO SECOND LANE) |
| | | (*, 1) | — |
| | | (1, 1) | ○ (TO SECOND LANE) |
| | TURNING LEFT | (1, *) | — |
| | | (*, 1) | — |
| | | (1, 1) | — |
| 2 | STRAIGHT AHEAD | (1, *) | — |
| | | (*, 1) | ○ (TO SECOND LANE) |
| | | (1, 1) | — |
| | TURNING RIGHT | (1, *) | — |
| | | (*, 1) | — |
| | | (1, 1) | — |
| | TURNING LEFT | (1, *) | — |
| | | (*, 1) | ○ (TO FIRST LANE) |
| | | (1, 1) | ○ (TO FIRST LANE) |

VEHICLE TRAVEL CONTROL DEVICE, AND VEHICLE TRAVEL CONTROL SYSTEM

TECHNICAL FIELD

The present invention relates to a vehicle travel control device and a vehicle travel control system, and particularly relates to a vehicle travel control device and a vehicle travel control system for controlling a traveling state on the basis of peripheral information of a host vehicle.

BACKGROUND ART

In recent years, development is underway for acceleration/deceleration control devices that recognize preceding vehicles by using forward recognition sensors such as an in-vehicle camera and an in-vehicle radar, and control a vehicle speed of a host vehicle by following acceleration/deceleration of the preceding vehicle so as to maintain an inter-vehicle distance between the preceding vehicle and the host vehicle. When the host vehicle approaches the preceding vehicle, this acceleration/deceleration control device decelerates a vehicle speed of the host vehicle to ensure an appropriate inter-vehicle distance to the preceding vehicle, by reducing an output of an internal combustion engine (hereinafter referred to as an engine) or by increasing a hydraulic pressure of a friction brake. Further, when the inter-vehicle distance to the preceding vehicle becomes long, or when the preceding vehicle deviates from a travel route of the host vehicle, control is performed to increase the output of the engine and accelerate to achieve a predetermined inter-vehicle distance or a predetermined vehicle speed. Such an acceleration/deceleration control device is disclosed, for example, in JP 2009-113763 A (PTL 1) and JP 2014-108643 A (PTL 2).

In an acceleration/deceleration control device described in PTL 1, a target vehicle speed calculation part determines whether to be a normal follow-up mode or an eco-follow-up mode. The target vehicle speed calculation part sets a target vehicle speed to follow a preceding vehicle with acceleration corresponding to the normal follow-up mode when the vehicle is in the normal follow-up mode, and sets a target vehicle speed to follow the preceding vehicle with acceleration smaller than the normal follow-up mode when the vehicle is in the eco-follow-up mode, thereby enabling improvement of fuel consumption performance.

In addition, the acceleration/deceleration control device described in PTL 2 includes: a travel control means to perform travel control of a host vehicle in accordance with a set vehicle speed; and a traveling speed acquisition means to acquire a traveling speed of a vehicle traveling on a lane adjacent to the lane in which the host vehicle travels. The acceleration/deceleration control device is to suppress sudden deceleration of the host vehicle at the time of lane change, by changing the lane of the host vehicle to the adjacent lane and simultaneously controlling the speed at which the host vehicle travels when the traveling speed is lower than the set vehicle speed, thereby enabling improvement of fuel consumption performance.

CITATION LIST

Patent Literature

PTL 1: JP 2009-113763 A
PTL 2: JP 2014-108643 A bulletin

SUMMARY OF INVENTION

Technical Problem

Meanwhile, as shown in FIG. 18, in the acceleration/deceleration control device described in PTL 1, an acceleration/deceleration speed of the host vehicle is controlled on the basis of an acceleration/deceleration state of the preceding vehicle. Therefore, even at a point A where a vehicle in front of the preceding vehicle has already started decelerating, the host vehicle continues to generate a driving force when the preceding vehicle is not decelerating, and the host vehicle stops or suppresses the generation of the driving force to decelerate only when the preceding vehicle decelerates at a point B. Therefore, from the point A to the point B, the generation of the driving force may be originally stopped or suppressed, and there is a possibility that the fuel efficiency may be deteriorated correspondingly.

Further, as shown in FIG. 19A, in the acceleration/deceleration control device described in PTL 2, traveling information is provided to the acceleration/deceleration control device by a data center that is a probe center. In the data center, when a front vehicle group (vehicles A to I) in which a large number of other vehicles exist is traveling in front of the host vehicle, at least vehicle speed information (solid arrow) of the front vehicle group is accumulated, in addition to the preceding vehicle of the host vehicle. Next, the data center calculates an average vehicle speed averaged for each lane and transmits to the host vehicle, rather than transmitting the accumulated vehicle speed information to the host vehicle as it is, in order to reduce a communication load.

In this case, as shown in FIG. 19B, as the number of vehicles in the traveling lane of the host vehicle increases, it takes time to detect deceleration of the front vehicle group, for example, for the average vehicle speed of the front vehicle group to fall below a deceleration determination threshold after the head of the front vehicle group (vehicle G) starts decelerating. This may cause a risk of delaying the timing at which the driving force of the host vehicle is stopped or suppressed, and preventing a desired fuel consumption performance from being obtained.

Further, as shown in FIG. 20, assuming a case of sequentially receiving vehicle speed information of the front vehicles (in order of the traveling lane of the host vehicle→adjacent lane, and in order of proximity from the host vehicle, vehicle A→vehicle B→vehicle C . . . →vehicle I) without averaging the vehicle speeds of the vehicles A to I, the following problem may occur. That is, if the vehicle B starts decelerating immediately after the vehicle speed information of the vehicle B is received, delay of $\Delta t$ time corresponding to one reception cycle occurs before the vehicle speed information of the vehicle B is obtained next. This may cause a risk of delaying the timing at which a driving force of the host vehicle is stopped or suppressed, and preventing a desired fuel consumption performance from being obtained.

An object of the present invention is to provide a novel vehicle travel control device and a vehicle travel control system capable of improving fuel consumption performance, by preferentially acquiring vehicle information of a vehicle having a deceleration cause in the vicinity ahead of the host vehicle, and rapidly stopping or suppressing generation of a driving force.

Solution to Problem

The present invention: determines a specific deceleration-causing vehicle, which impacts the travel of a host vehicle, on the basis of vehicle information corresponding to a plurality of other vehicles having a deceleration cause (hereinafter referred to as deceleration-causing vehicles), the vehicle information having been transmitted from a data center, and at least planned travel route information of the host vehicle; transmits vehicle-specifying information indicating the determined specific deceleration-causing vehicle to the data center, and acquires priority vehicle information pertaining to the specific deceleration-causing vehicle preferentially transmitted from the data center; and, on the basis of the preferentially-acquired priority vehicle information for the specific deceleration-causing vehicle, determines driving force control information for the host vehicle and controls the state in which the driving force of the host vehicle is generated.

Advantageous Effects of Invention

According to the present invention, it is possible to improve fuel consumption performance by preferentially acquiring vehicle information of other vehicle having a deceleration cause in the vicinity ahead of the host vehicle, and rapidly stopping or suppressing generation of a driving force.

DESCRIPTION OF EMBODIMENTS

Hereinafter, embodiments of the present invention will be described in detail with reference to the drawings. However, the present invention is not limited to the following embodiments, but includes various modifications and application examples in the scope of the present invention within the technical concept of the present invention.

Example 1

Figure 1:
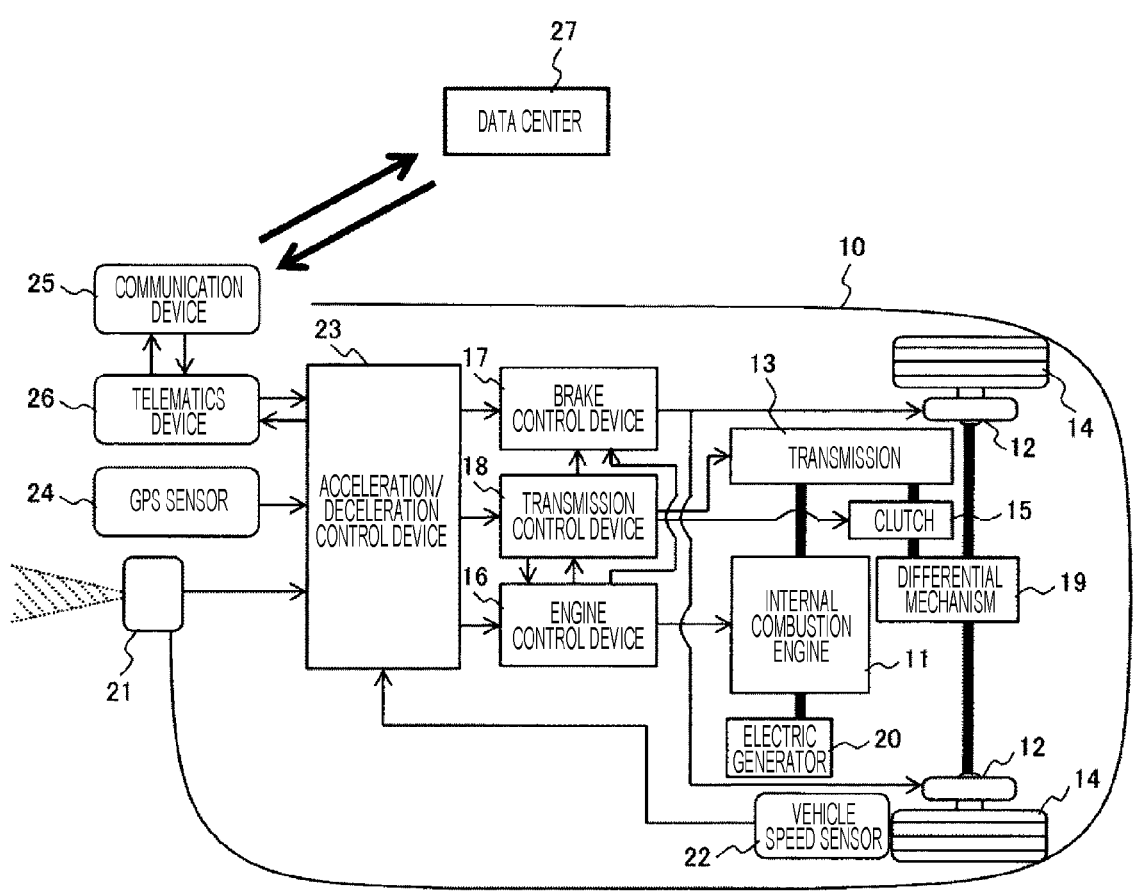
FIG. 1 is a configuration diagram showing a configuration of a vehicle provided with a travel control device according to a first embodiment of the present invention.

Hereinafter, a first embodiment of the present invention will be described. First, an overall configuration of a vehicle provided with a travel control device will be described with reference to FIG. 1.

A vehicle 10 includes an engine 11 as a power source, and a brake 12 to brake the vehicle, a transmission 13 to shift a driving force generated by the engine 11 to an appropriate speed, a clutch 15 to transmit a driving force between the transmission 13 and a wheel 14, an engine control device 16 to control a throttle body, a fuel injection device, an ignition device, and the like (not shown) such that the engine 11 generates a desired driving force, a brake control device 17 to adjust a braking force of the vehicle 10 caused by the brake 12 by controlling a hydraulic pressure of the brake 12, a transmission control device 18 to adjust a gear ratio of the transmission 13 and control power transmission of the clutch 15, an operating mechanism 19 to adjust a rotational speed of the left and right wheels 14 in accordance with a steering direction, and an electric generator 20 driven by the engine 11. These components of the mechanical system are already well known.

Furthermore, the vehicle 10 includes a forward recognition sensor 21 to detect an object in front, a vehicle speed sensor 22 to detect a vehicle speed of the vehicle 10, an acceleration/deceleration control device 23 to instruct operation to the engine control device 16, the brake control device 17, and the transmission control device 18, a GPS sensor 24 to detect position information of the vehicle 10, a communication device 25 capable of communicating with a data center 27, and a telematics device 26 to manage data to be subjected to communication by the communication device 25 with the data center 27. Here, data communication is performed not only by the data sweater 27, but also communication with a surrounding vehicle (vehicle-to-vehicle communication) and communication with an information terminal installed on a road (road-to-vehicle communication) are included.

The engine 11 is powered from chemical energy of fuel by combustion of the fuel. The generated power is transmitted to the transmission 13, and rotates the left and right wheels 14 via the clutch 15 and the differential mechanism 19 after being shifted by a winding transmission mechanism (CVT mechanism) in the transmission 13, and the vehicle 10 is driven by a rotational force of the wheels 14.

In the vicinity of the wheel 14, the brake 12 to apply a braking force to the vehicle 10 is provided. The brake 12 has a brake disc (not shown) that rotates with the wheel 14. A braking force is generated by pressing a friction body against a sliding surface of the brake disc to convert a rotational force of the brake disc into frictional heat, and converting kinetic energy into thermal energy. This action enables braking of the vehicle 10.

The engine control device 16 includes: an arithmetic unit to execute various control programs necessary to control the engine 11; a primary storage device to hold an operation process and an operation result; a secondary storage device to store a control program and various control constants; an I/O port capable of communicating with various control devices including the acceleration/deceleration control device 23, in addition to transmitting a control command to a throttle body, a fuel injection valve, an ignition device, and the like (not shown) attached to the engine 11; and an A/D converter to take in a vehicle speed measured by the vehicle speed sensor 22 and a measurement value of an air flow meter (not shown) that measures an amount of air taken into the engine 11.

The engine control device 16 executes a control program to adjust an amount of intake air and an amount of fuel injection so as to cause the engine 11 to generate a desired driving force. The engine 11 can convert chemical energy of the fuel into thermal energy by combustion, and obtain a driving force by converting a force pushing down the piston with pressure caused by expanding the taken-in air, into a rotational force by the crank mechanism.

The transmission control device 18 includes an arithmetic unit, primary and secondary storage devices, an I/O port, an A/D converter, and the like, similarly to the above-described engine control device 16. The transmission converts a driving force of the engine 11 into an appropriate rotational speed and a torque by controlling a hydraulic pressure to obtain a desired deceleration ratio, and transmits the torque to the wheels 14 through the differential mechanism 19.

The brake control device 17 also includes an arithmetic unit, primary and secondary storage devices, an I/O port, an A/D converter, and the like, similarly to the engine control device 16. Controlling a hydraulic pressure supplied to the brake 12 changes a degree of pressing of the friction body against the brake disc, thereby changing an amount of kinetic energy converted into thermal energy by the brake 12 to obtain a desired braking force.

The acceleration/deceleration control device 23 also includes an arithmetic unit, primary and secondary storage devices, an I/O port, an A/D converter, and the like, similarly to the engine control device 16. The acceleration/deceleration control device 23 uses recognition information of the forward recognition sensor 21, speed information from the vehicle speed sensor 22, travel route information of the host vehicle, and the like, to instruct a braking force and a driving force to the engine control device 16, the brake control device 17, and the transmission control device 18.

Then, the acceleration/deceleration control device 23 instructs to decelerate when the inter-vehicle distance to the preceding vehicle detected by the forward recognition sensor 21 becomes short, and on the other hand, instructs to accelerate the host vehicle up to a predetermined speed when the inter-vehicle distance to the preceding vehicle detected by the forward recognition sensor 21 becomes long, or when the preceding vehicle is not recognized. Doing this enables travel control in accordance with operation of surrounding other vehicles without the host vehicle approaching the preceding vehicle too much.

In a vehicle with the above configuration, the acceleration/deceleration control device 23 according to the first embodiment of the present invention selectively and preferentially obtains vehicle information of a plurality of other vehicles around the host vehicle through wireless communication with the data center 27. Then, the acceleration/deceleration state of the host vehicle is controlled from the selected vehicle information of other vehicles.

Figure 2:
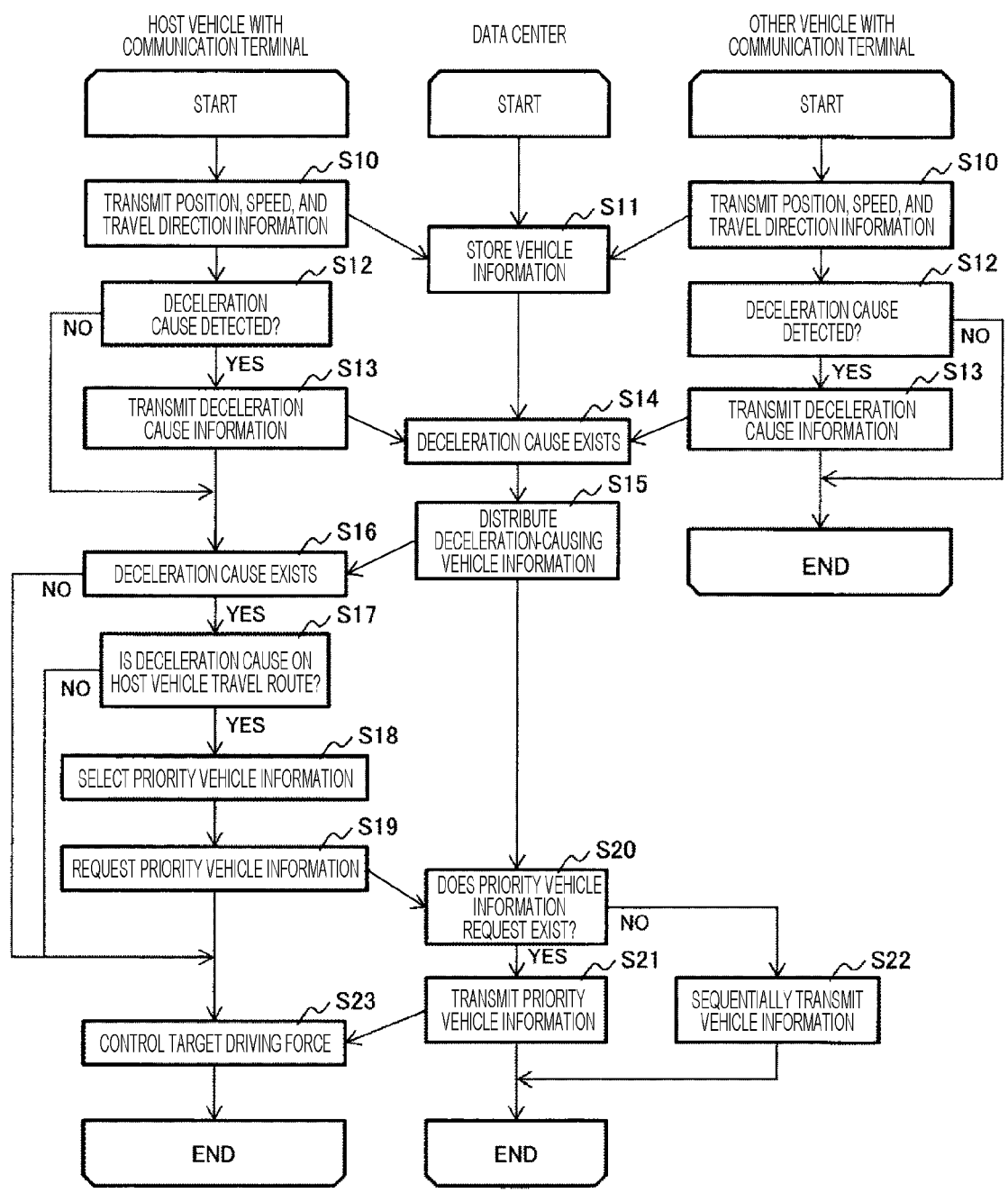
FIG. 2 is an explanatory view for explaining processing contents of a host vehicle and a data center, and the data center and other vehicle of the travel control device according to the first embodiment of the present invention.

Next, a specific processing operation between the vehicle (host vehicle) 10 and the data center 27 according to the present embodiment will be described in detail with reference to FIG. 2. FIG. 2 shows each processing operation including communication of the host vehicle equipped with a communication terminal capable of communicating with the data center 27; the data center 27; and other vehicle equipped with a communication terminal capable of communicating with the data center 27. Here, other vehicle is a plurality of other vehicles, but for convenience of explanation, regarded as one other vehicle.

Note that, in the following, the host vehicle equipped with a communicable communication terminal and other vehicle equipped with a communicable communication terminal will be referred to simply as a host vehicle and other vehicle. Further, the host vehicle and the other vehicle are not absolute, and the vehicle to be the subject is described as the host vehicle for convenience.

First, in step S10 executed by the host vehicle and the other vehicle, basic vehicle information such as a current position, a current speed, and a traveling direction of each vehicle of the host vehicle and the other vehicle are transmitted to the data center 27. Further, planned travel route information of each vehicle set by a navigation device or the like is also transmitted to the data center 27.

Here, the data to be transmitted is not limited to the vehicle information of each vehicle. When there is surrounding vehicle information of surrounding other vehicles detected by a surrounding vehicle recognition sensor (an in-vehicle radar, an in-vehicle camera, and the like) mounted on the host vehicle and the other vehicle, a current position, a current speed, and the like of surrounding other vehicles may be simultaneously transmitted.

Figure 3A:
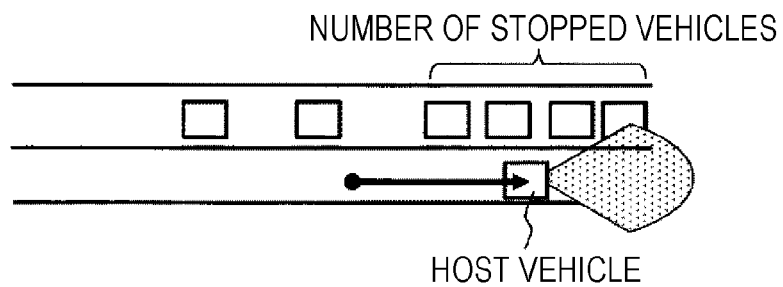
FIG. 3A is an explanatory view for explaining a first method of detecting traffic information.
Figure 3B:
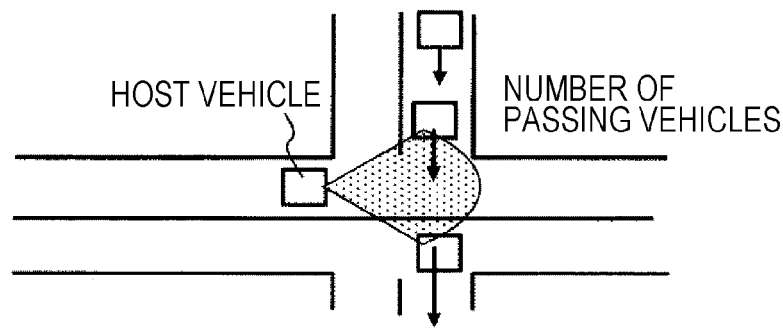
FIG. 3B is an explanatory view for explaining a second method of detecting traffic information.
Figure 3C:
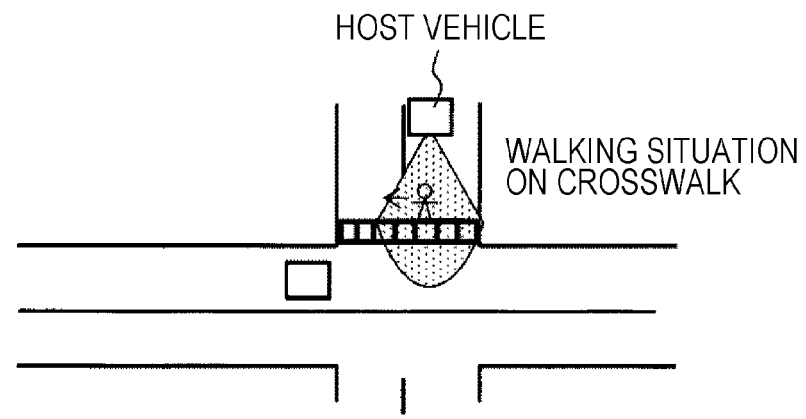
FIG. 3C is an explanatory view for explaining a third method of detecting traffic information.

In addition, when traffic information pertaining to traffic conditions can be detected, the traffic information may also be transmitted. For example, the number of vehicles stopped in an adjacent lane different from the traveling lane in which the host vehicle travels as shown in FIG. 3A, the number of vehicles passing an intersection as shown in FIG. 3B, a situation of a pedestrian on a crosswalk as shown to FIG. 3C, and the like can be transmitted to the data center 27. Here, "host vehicle" in FIGS. 3A to 3C means a vehicle detecting the above-described traffic information.

The data center 27 that has received the vehicle information generates necessary vehicle information from the individual vehicle information. Then, in step S11 executed by the data center 27, vehicle information and the like received from the host vehicle and the other vehicle are sequentially updated and stored in the storage device. In this case, since a map database is stored in the storage device, each vehicle position is to be mapped on the map with use of the current position data of the vehicle information.

Next, in step S12 executed by the host vehicle and the other vehicle, on the basis of detection information from a surrounding environment recognition sensor or the like attached to the host vehicle, it is determined whether or not a deceleration cause has occurred in the host vehicle and surrounding other vehicles.

Figure 4A:
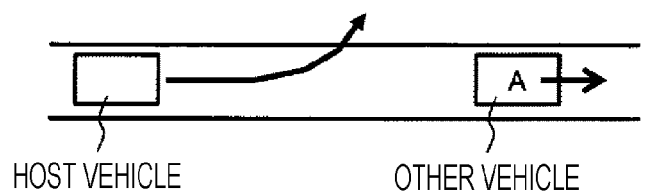
FIG. 4A is an explanatory view for explaining a first method of detecting a deceleration cause.
Figure 4B:
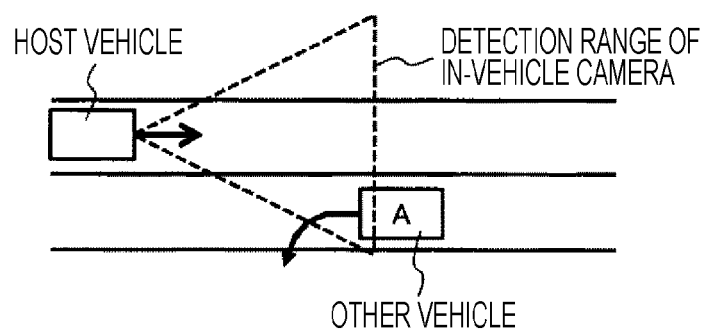
FIG. 4B is an explanatory view for explaining a second method of detecting a deceleration cause.

Specifically, there are a case where a deceleration cause of the host vehicle is detected as shown in FIG. 4A, and a case where a deceleration cause of other than the host vehicle is detected as shown in FIG. 4B. In the case of FIG. 4A, as long as a planned travel route of the host vehicle can be acquired, it is possible to determine whether or not the deceleration is for the host vehicle to turn left at the next intersection. Further, in the case of FIG. 4B, when it is possible to detect turn indicator blinking information of a surrounding other vehicle A with an in-vehicle camera or the like that is a surrounding environment recognition sensor, and the vehicle speed decreases, the deceleration cause is determined as "left turn deceleration".

Then, the process proceeds to step S13 when the deceleration cause is detected, but the process proceeds to step S16 without executing step S13 when the deceleration cause has not occurred.

In step S13 executed by the host vehicle and the other vehicle, when the deceleration cause is detected, the deceleration cause information is transmitted to the data center 27. Specifically, as the deceleration cause information, a current position of the detected vehicle (in this case, also including a traveling lane), a vehicle speed, acceleration/deceleration, a vehicle type (normal car, truck, bus), and the detail of the deceleration cause (waiting for right or left turn, a red light, interruption, merging, roadside parking, and the like) are transmitted. Here, when the detail of the deceleration cause cannot be specified although the vehicle is in the deceleration state, the deceleration cause is transmitted to the data center 27 as "unknown".

In the data center 27 that has received the deceleration cause information, the individual deceleration cause information is processed to generate necessary deceleration cause information. In step S14 executed by the data center 27, the deceleration cause information transmitted from each vehicle is identified and integrated (=processed). In integrating these information, it is determined whether the deceleration cause information has been acquired indirectly (detected from a surrounding environment recognition sensor of other vehicle), or has been successfully acquired directly (the deceleration cause has been detected by the vehicle itself), and processing is executed to increase the reliability of deceleration cause information that has been successfully acquired directly.

This is because, in the case of deceleration cause information acquired indirectly, there is a possibility that the target vehicle to be the deceleration cause is lost, or an error may occur in the current position or the current speed of the target vehicle to be the deceleration cause. Therefore, the detection accuracy of the deceleration cause information can be improved by adopting the deceleration cause information acquired as directly as possible. When the deceleration cause information is determined, the process proceeds to step S15, and the deceleration cause information is transmitted to the each of the vehicles (the host vehicle and the other vehicle).

Here, as the transmission timing from the data center 27, transmission is sequentially performed corresponding to other vehicles within a predetermined range, in order of proximity from the host vehicle. Meanwhile, control of the host vehicle to be subjected to driving force control will be described below.

Next, in step S16 executed by the host vehicle, it is determined whether or not deceleration cause information has been received from the data center 27. The process proceeds to step S17 when it is determined that there is other vehicle having a deceleration cause after receiving the deceleration cause information, and the process proceeds to step S23 where it is determined that there is no other vehicle having a deceleration cause.

Then, in step S17, from the received deceleration cause information, it is determined whether or not other vehicle having a deceleration cause is on the travel route of the host vehicle and impacts the travel of the host vehicle. When it is determined that the other vehicle is on the travel route of the host vehicle and impacts the travel of the host vehicle, the process proceeds to step S18. When it is determined that the other vehicle is on the travel route of the host vehicle but does not impact the travel of the host vehicle, the process proceeds to step S23.

Figure 5:
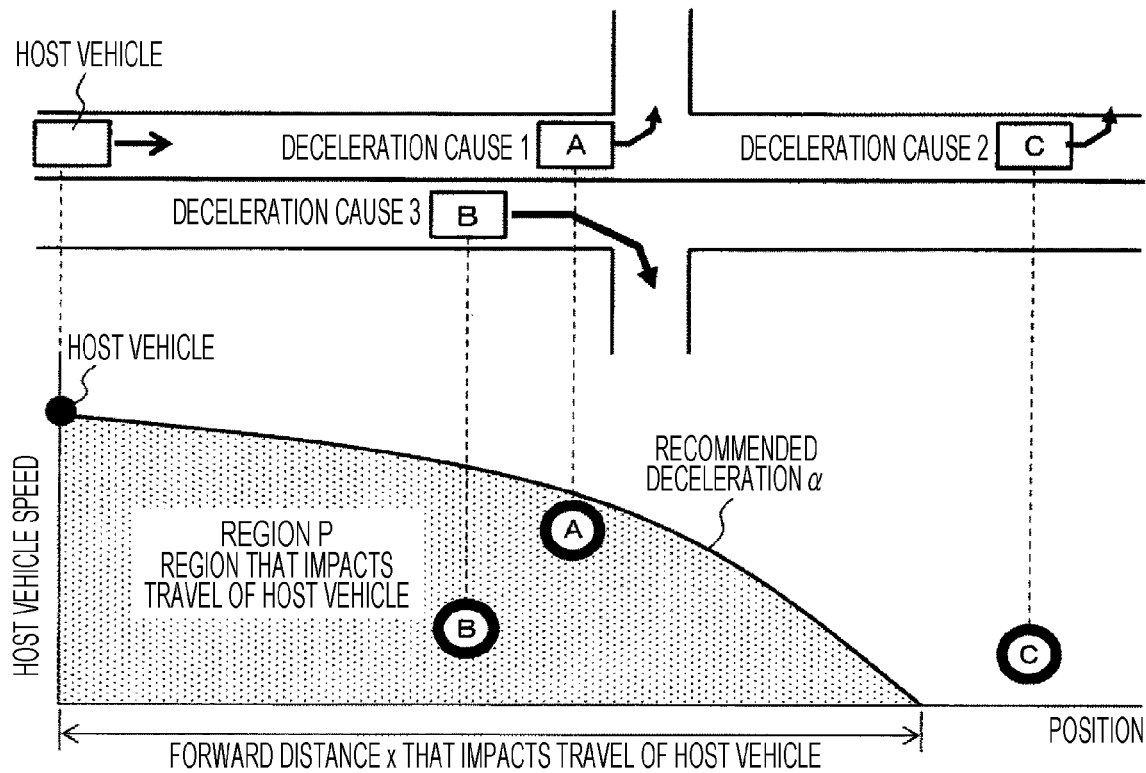
FIG. 5 is an explanatory view for explaining a method of determining other vehicle having a deceleration cause.

Here, a determination method in step S17 described above will be described with reference to FIG. 5. In FIG. 5, a case is assumed where deceleration causes 1 to 3 occur simultaneously in preceding other vehicles A to C. On the basis of a current speed and a current position (black framed circle) of the other vehicles A to C, a current speed and a current position (black circle) of the host vehicle, and a deceleration $\alpha$ to be recommended from the viewpoint of fuel efficiency, a forward distance x that impacts the travel of the host vehicle is calculated by Expression (1). Furthermore, by calculating a vehicle speed that impacts at the current position of each vehicle, a region P that impacts the travel of the host vehicle is calculated.

[Formula 1]

$$x = \frac{V_0^2}{2\alpha} \tag{1}$$

Here, Vo is a vehicle speed of the host vehicle, and $\alpha$ is a deceleration $\alpha$ to be recommended from the viewpoint of fuel consumption.

Note that, the deceleration $\alpha$ is calculated on the basis of any deceleration of: a deceleration $\alpha_s$ corresponding to the running resistance shown in Expression (2) where driving energy of the engine does not contribute to an increase in kinetic energy; or a deceleration $\alpha_e$ at a time of engine braking that does not consume fuel shown in Expression (3).

[Formula 2]

$$\alpha_s = -\frac{1}{M}C_d SV^2 - \mu g\cos\theta - g\sin\theta \qquad (2)$$

[Formula 3]

$$\alpha_e = \alpha_s + F_{ed} \times G_c \times G_f / r \qquad (3)$$

Note that M represents vehicle weight, $C_d$ represents an air resistance coefficient, S represents a front projection region of the vehicle, V represents a vehicle speed, $\mu$ represents a rolling resistance coefficient, g represents a gravity acceleration, $\theta$ represents a road surface gradient, $F_{ed}$ represents an engine friction torque at engine braking, $G_c$ represents a gear ratio of a transmission ratio, $G_f$ represents a final reduction gear ratio, and r represents a tire radius.

Then, in the case of FIG. 5, it can be seen that the other vehicle A and the other vehicle B are in a region that impacts the travel of the host vehicle, and the other vehicle C is in a region that does not impact the travel of the host vehicle. Therefore, the other vehicles A and B are set as candidates for other vehicle having a deceleration cause on the travel route of the host vehicle.

When the candidate of other vehicle having a deceleration cause is determined, the process proceeds to step S18. Meanwhile, since there are various examples of the deceleration cause, any determination method corresponding to the deceleration cause may be adopted without limiting to the method described above.

Next, in step S18, vehicle information to be preferentially acquired from other vehicle having a deceleration cause on the travel route of the host vehicle is selected and specified. Specifically, since the planned travel route of the host vehicle can be acquired, the other vehicle A on the traveling lane of the host vehicle is specified, and the vehicle information of the other vehicle A is prioritized when the planned travel route is straight ahead or turning left, while the other vehicle B is specified and the vehicle information is preferentially acquired when the planned travel route is turning right.

Further, when the planned travel route of the host vehicle is unknown, vehicle information of both of the other vehicles A and B is to be acquired. Note that FIG. 5 only shows an example, and it is needless to say that selection of priority vehicle information corresponding to other traveling state is possible. When priority vehicle information of other vehicle having a deceleration cause is selected, the process proceeds to step S19.

In step S19, the data center 27 is requested for priority vehicle information of either one of the other vehicles A and B to be acquired preferentially, or priority vehicle information of both of the other vehicles A and B.

The data center 27 that has received the request for priority vehicle information executes the following control. In step S20, it is determined whether there is a request for priority vehicle information. This can be determined by a request signal for priority vehicle information from step S19, and the process proceeds to step S21 when there is a request for priority vehicle information, while the process proceeds to step S22 when there is no request for priority vehicle information.

Here, the data center 27 sequentially transmits vehicle information of other vehicles present in front of the host vehicle that has requested the priority vehicle information. That is, the data center 27 periodically transmits vehicle information of other vehicles present in a predetermined area in front of the host vehicle. For example, as in FIG. 6A, the data center 27 transmits, in vehicle information of a predetermined area in which the other vehicles A to E are present, vehicle information of individual other vehicle in the order of the other vehicle A→the other vehicle B→the other vehicle C→the other vehicle D→the other vehicle E in order of proximity from the host vehicle. Moreover, other vehicle shown with the broken line between the host vehicle and the other vehicle A indicates that vehicle information is not to be obtained since this other vehicle is not a vehicle equipped with a communication terminal. Therefore, as shown in FIG. 6A, if there is no request for priority vehicle information to be acquired preferentially, the data center 27 is to proceed to step S22, and repeatedly transmit vehicle information in the order of the other vehicle A→the other vehicle B→the other vehicle C→the other vehicle D→the other vehicle E.

Figure 6A:
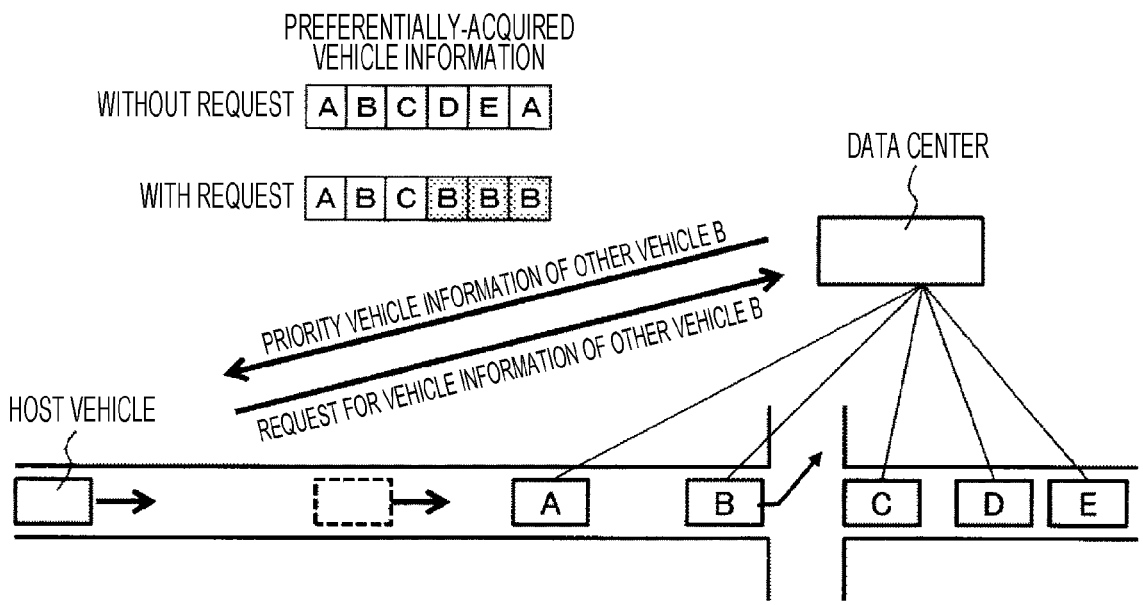
FIG. 6A is an explanatory view for explaining a communication method of other vehicle having a deceleration cause.

Whereas, in FIG. 6A, since it is known that the other vehicle B is turning left, the other vehicle B is regarded as a vehicle having a deceleration cause. Therefore, the process proceeds to step S21, and the vehicle information pertaining to the other vehicle B as priority vehicle information is to be transmitted. For example, as shown in FIG. 6A, when transmission has been completed up to the other vehicle C, other vehicle as the next transmission target is to be the other vehicle B, and the vehicle information of the other vehicle B is to be continuously transmitted. This allows a traveling state of the other vehicle B to be preferentially monitored. Note that any number of transmissions of the priority vehicle information may be adopted without limiting to three times as shown in FIG. 6A, that is, it is only necessary to be able to detect the deceleration state of the other vehicle B.

Next, in step S23 executed by the host vehicle, the engine control device 16 controls a driving force on the basis of the priority vehicle information sent from the data center 27. Therefore, it is possible to perform deceleration by stopping or suppressing generation of a driving force without waiting for deceleration of the other vehicle A that is preceding in proximity to the host vehicle.

Figure 6B:
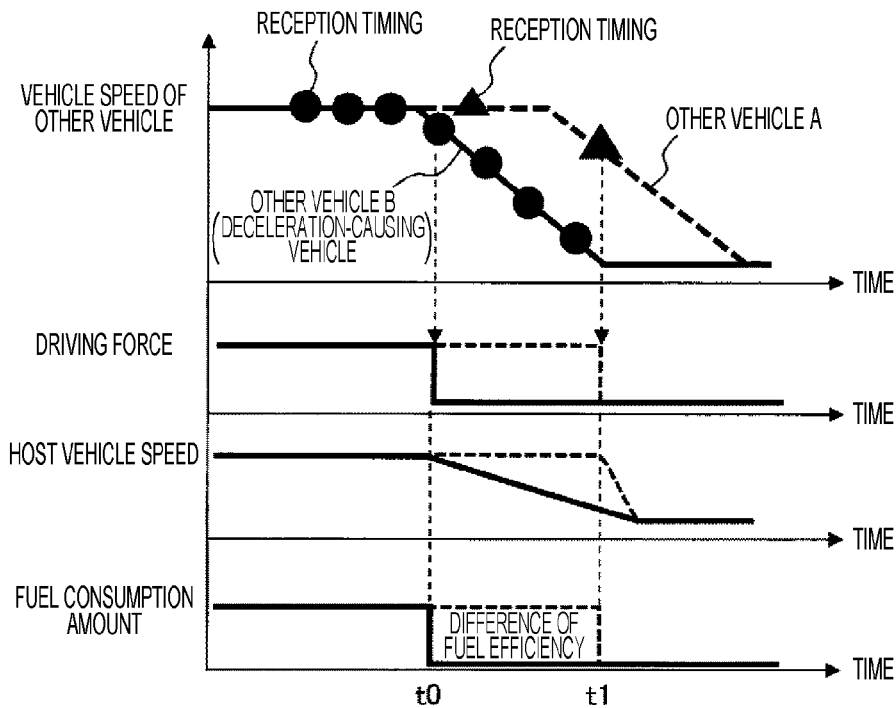
FIG. 6B is an explanatory view for comparing and explaining a conventional communication method of other vehicle having a deceleration cause and a communication method of the present embodiment.

As shown in FIG. 6B, in a conventional method shown by a dotted line, when a driving force is controlled on the basis of periodically updated vehicle information of the other vehicle A in proximity to the host vehicle, the deceleration of the other vehicle A is detected at time t1, and control to stop or suppress the driving force is to be executed to decelerate the host vehicle. As described above, since the conventional method is a method of detecting the deceleration state of the other vehicle A in proximity to the host vehicle, the timing at which the driving force is stopped or suppressed tends to be delayed inevitably.

Whereas, in the present embodiment, a deceleration cause in which the other vehicle B is turning left is detected in advance, and the data center 27 is requested to preferentially transmit the vehicle information of the other vehicle B. Then, in response to this, the data center 27 preferentially transmits the vehicle information of the other vehicle B to the host vehicle every time the transmission timing comes.

This causes the host vehicle to receive the vehicle information of the other vehicle B at every transmission timing of the data center 27, detect deceleration of the other vehicle B at time t0, and execute control to stop or suppress the driving force. Thus, by preferentially detecting vehicle information of other vehicle having a deceleration cause, the timing to stop or suppress the driving force can be advanced from time t1 to time t0, thereby enabling improvement of fuel consumption performance.

Here, the data center 27 is configured to be able to transmit vehicle information pertaining to other vehicles around the other vehicle having a deceleration cause in a case where the information pertaining to the priority vehicle information has not been updated in step S21 (for example, the vehicle information cannot be newly received from the vehicle with a communication terminal). Specifically, among vehicle information of other vehicles between other vehicle having a deceleration cause and the host vehicle, vehicle information of other vehicle closer to the other vehicle having a deceleration cause is to be transmitted.

According to this, even if vehicle information of other vehicle having a deceleration cause cannot be newly acquired, it is possible to detect a deceleration state of the front vehicle group as early as possible by receiving vehicle information of other vehicle near the other vehicle having a deceleration cause. Therefore, since the control for stopping or suppressing the driving force can be performed at an early timing, the fuel consumption performance can be improved.

Figure 7:
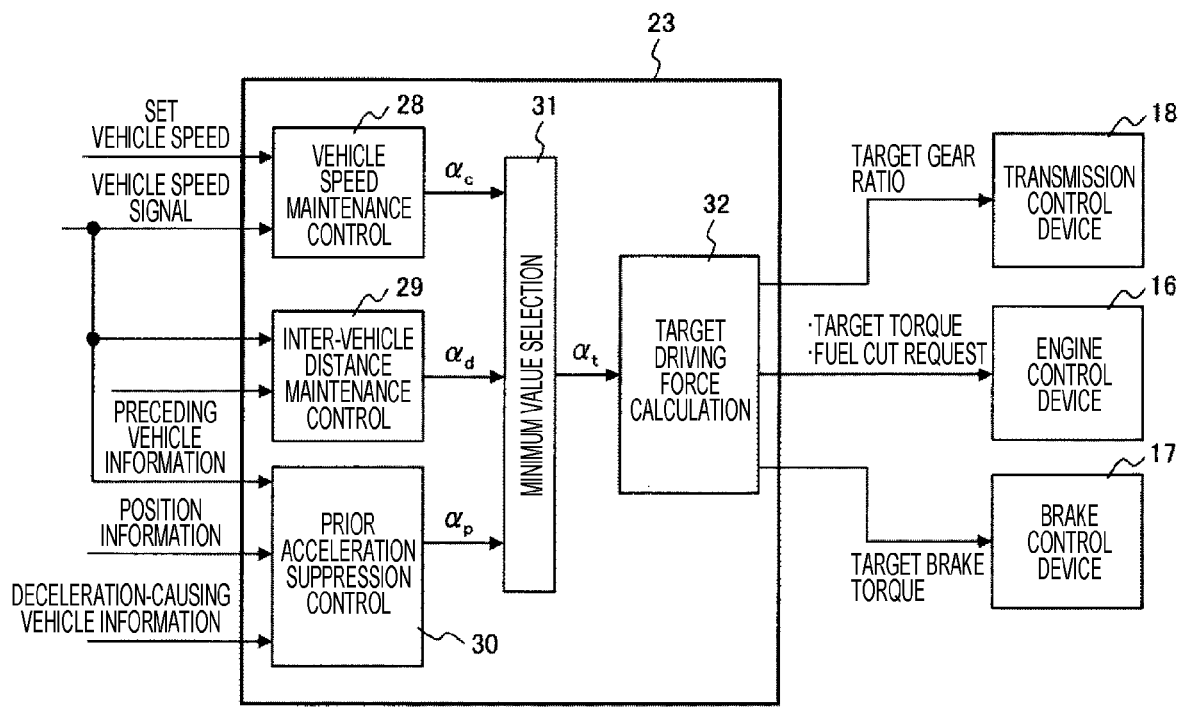
FIG. 7 is a configuration diagram showing a configuration of an acceleration/deceleration control device used in the travel control device according to the first embodiment of the present invention.

Next, a configuration of a control block of a travel control device that controls a target driving force will be described with reference to FIG. 7. The travel control device is configured by the acceleration/deceleration control device 23, the engine control device 16, the brake control device 17, and the transmission control device 18.

The acceleration/deceleration control device 23 calculates a target acceleration on the basis of: preceding vehicle information outputted by the forward recognition sensor 21; vehicle speed information outputted by the vehicle speed sensor 22; position information outputted by the GPS sensor 24; and vehicle information of other vehicle having a deceleration cause obtained through the communication device 25 and the telematics device 26.

A target acceleration $\alpha_t$ is determined from: a target acceleration $\alpha_c$ determined by a vehicle speed maintenance control block 28; a target acceleration $\alpha_d$ determined by an inter-vehicle distance maintenance control block 29; and a target acceleration $\alpha_p$ to suppress acceleration in advance on the basis of vehicle information of other vehicle having a deceleration cause obtained by a prior acceleration suppression block 30. That is, the target acceleration $\alpha_c$, the target acceleration $\alpha_d$, and the target acceleration $\alpha_p$ are inputted to a minimum value selection block 31, and the smallest target acceleration is selected and outputted as the target acceleration $\alpha_t$.

Then, on the basis of the calculated target acceleration $\alpha_t$, a target driving force block 32 calculates a target driving force $F_t$ by Expression (4).

[Formula 4]

$$F_t = M\alpha_t + \tfrac{1}{2} C_d S V^2 + \mu g M \cos\theta + M g \sin\theta \quad (4)$$

Note that, in order to calculate a target gear ratio, it is necessary to calculate a target engine speed. In order to calculate the target engine speed, first, a target engine output $P_e$ is calculated from the target driving force $F_t$ and the vehicle speed by using Expression (5).

[Formula 5]

$$P_e = F_t \times V \quad (5)$$

Figure 8:
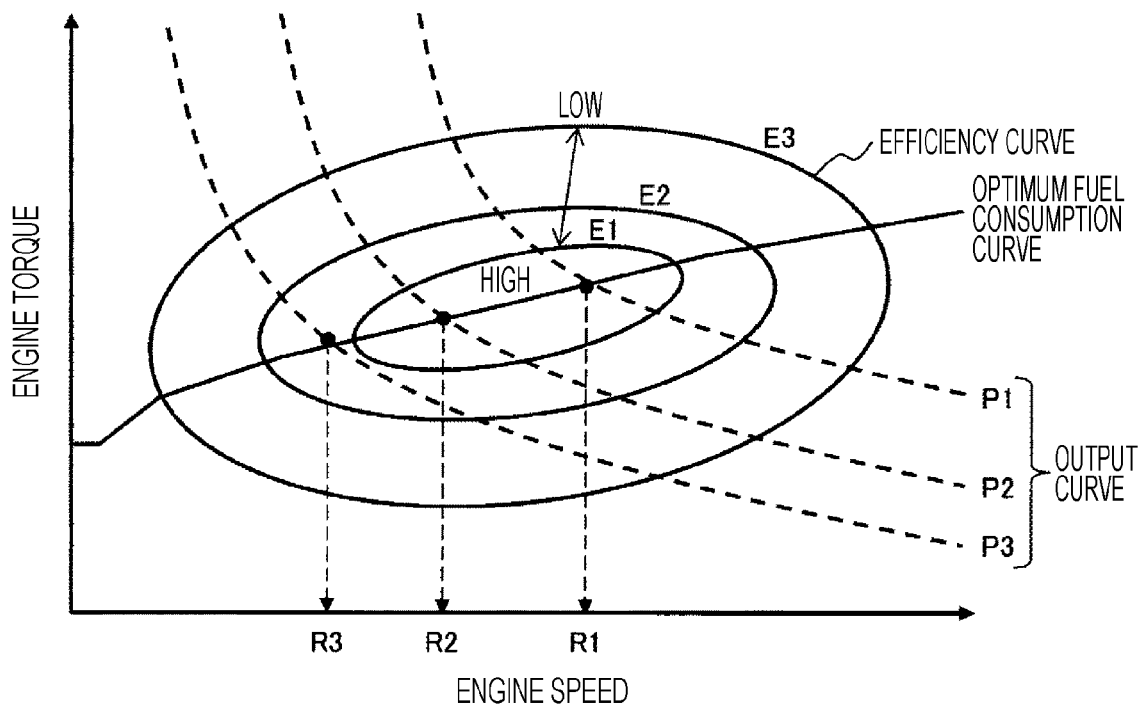
FIG. 8 is a characteristic view showing a relationship between engine efficiency and an engine torque.

Then, the target engine speed is to be calculated on the basis of the obtained target engine output $P_e$ and the efficiency characteristic of the engine shown in FIG. 8.

Here, FIG. 8 shows an engine output and the efficiency characteristic when the horizontal axis is an engine speed and the vertical axis is an engine torque. As an efficiency curve (solid line) approaches the center as E1>E2>E3, the engine efficiency is to be higher. Further, the most efficient engine speed in a predetermined output is a point at which an output curve (dotted line) and an optimum fuel consumption curve cross each other.

Figure 9:
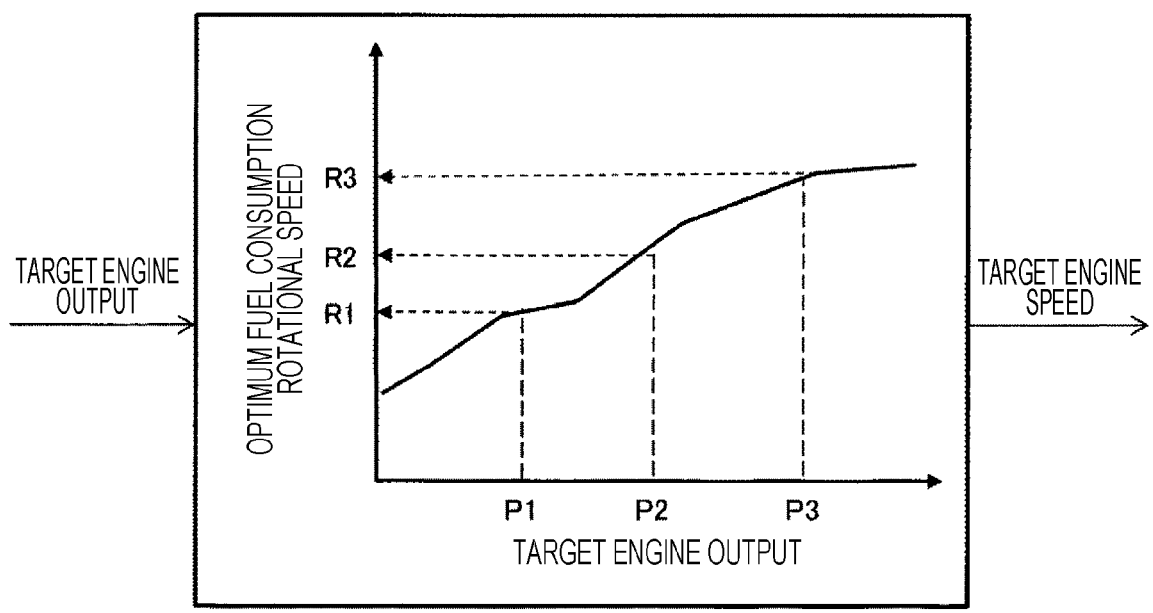
FIG. 9 is an explanatory view for explaining a relationship between a target engine output and a target engine speed.

In the case of FIG. 8, an optimum fuel consumption rotational speed $R_t$ is R1, R2, and R3 for the respective outputs P1, P2, and P3. On the basis of this relationship, a relationship between an optimum fuel consumption rotational speed for the target engine output is to be as shown in FIG. 9. By outputting this optimum fuel consumption rotational speed $R_t$ as a target engine speed, it is possible to control the driving force of the engine more efficiently.

Further, on the basis of the target engine speed $R_t$ (=optimum fuel consumption rotational speed) and a vehicle speed V, a target gear ratio $G_t$ can be calculated by the following Expression (6). Here, r represents a tire radius.

[Formula 6]

$$G_t = \frac{V}{R_t} \times \frac{60}{2\pi r} \quad (6)$$

Next, a target engine torque $T_e$ can be calculated by using the following Expression (7) on the basis of the target driving force $F_t$, the gear ratio $G_t$, and the like.

[Formula 7]

$$T_e = \frac{r \times F_t}{G_f \times G_c \times G_t} \quad (7)$$

Here, r is an effective radius of the tire, $G_f$ is a gear ratio of a final reduction gear, $G_c$ is a gear ratio of CVT, and $G_t$ is a torque amplification ratio of a torque converter.

Further, for a fuel cut request, it is possible to decelerate in a fuel cut state, that is, by engine braking, by turning ON the fuel cut request on the basis of a result of comparing the target driving force $F_t$ and an engine friction torque $T_{ed}$ as shown in the following Expression (8).

[Formula 8]

$$\text{Fuelcut request} = \begin{cases} \text{on} & \ldots \left( T_{ed} > \dfrac{r \times F_t}{G_f \times G_c} \right) \\ \text{off} & \ldots \left( T_{ed} \leq \dfrac{r \times F_t}{G_f \times G_c} \right) \end{cases} \quad (8)$$

Figure 10:
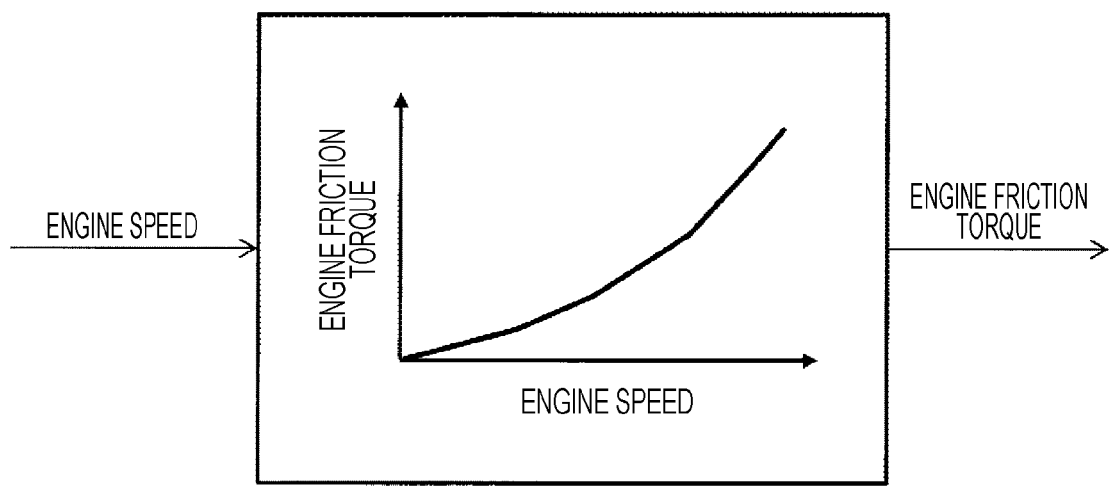
FIG. 10 is an explanatory view for explaining a relationship between an engine speed and an engine friction torque at a time of fuel cut.

Here, in accordance with engine specification and the like, the engine friction torque $T_{ed}$ is calculated on the basis of a relationship between the engine speed and the engine friction torque $T_{ed}$ as shown in FIG. 10.

The target brake torque is calculated by using the target driving force $F_t$, the gear ratio, and the like by using the following Expression (9).

[Formula 9]

$$F_h = T_{ed} \times G_c \times G_f - F_t \times r \quad (9)$$

Here, $T_{ed}$ is an engine friction torque at the time of engine fuel cut. In addition, during idling without fuel cut at the time of deceleration, calculation is performed by using an engine torque equivalent to creep instead of the engine friction torque $T_{ed}$, since the engine torque equivalent to creep is transmitted to the wheels.

Then, on the basis of a target torque signal outputted from the acceleration/deceleration control device 23, the engine control device 16 calculates a fuel/air supply amount signal for commanding a fuel/air supply amount to the engine 11. This enables control of the engine torque generated by the engine 11. Further, on the basis of a target rotational speed signal outputted from the acceleration/deceleration control device 23, the transmission control device 18 calculates a transmission hydraulic pressure signal for commanding a hydraulic pressure to be supplied to the transmission 13. This enables control of a gear ratio of the transmission 13, that is, a rotation speed of the drive shaft. Similarly, on the basis of the target braking force signal outputted from the acceleration/deceleration control device 23, the brake control device 17 calculates a brake hydraulic pressure signal for commanding a hydraulic pressure to be supplied to the brake 12. This enables control of the braking force generated by the brake 12.

Returning to FIG. 7, the vehicle speed maintenance control block 28 has a function of controlling acceleration such that the vehicle speed of the host vehicle becomes a set vehicle speed that has been set by a driver. The target acceleration $\alpha_c$ at that time is set so as to be larger acceleration as a difference between the set vehicle speed and the current vehicle speed increases, in consideration of the vehicle speed followability.

Figure 11:
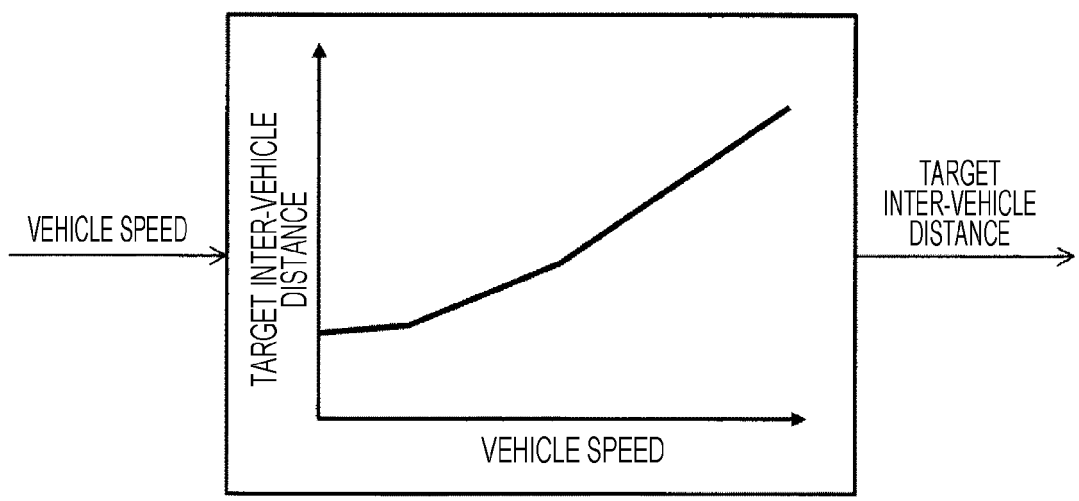
FIG. 11 is an explanatory view for explaining a relationship between a vehicle speed and a target inter-vehicle distance at a time of inter-vehicle maintenance control.

Further, the inter-vehicle distance maintenance control block 29 has a function of controlling acceleration such that the inter-vehicle distance becomes a target inter-vehicle distance that has been set. Specifically, as shown in FIG. 11, the target inter-vehicle distance is set to be longer as the vehicle speed of the host vehicle increases, and the target acceleration $\alpha_d$ is set such that a difference between this set target inter-vehicle distance and an actual inter-vehicle distance becomes small.

Figure 12:
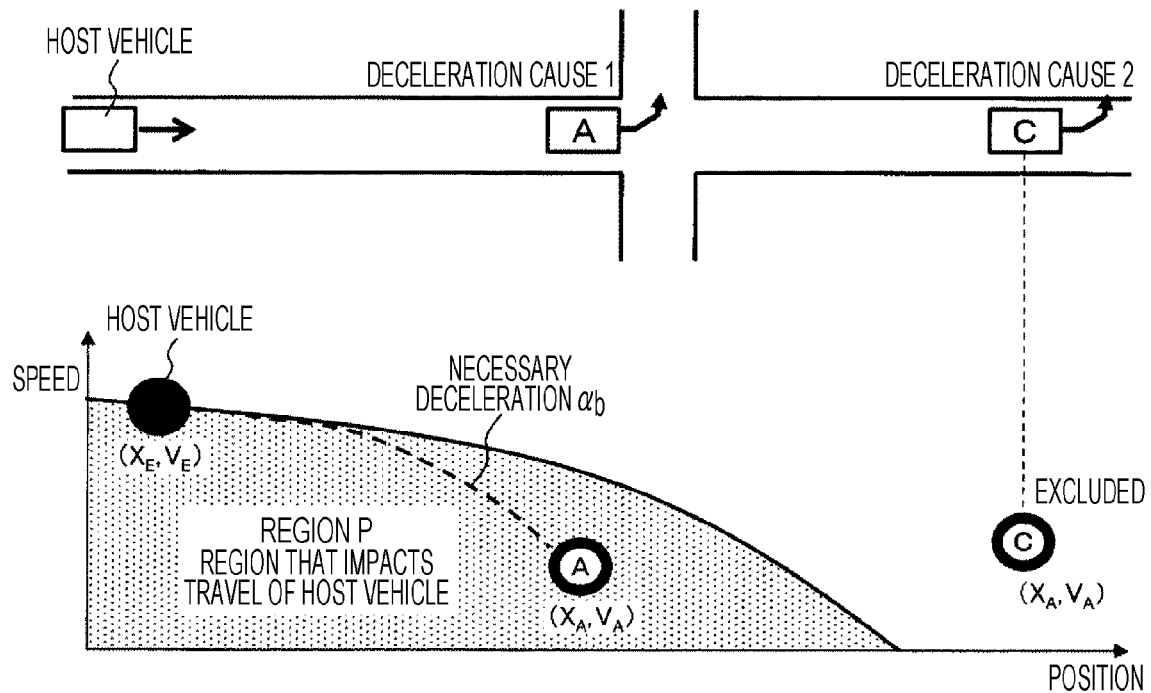
FIG. 12 is an explanatory view for explaining a method of determining other vehicle having a deceleration cause at a time of prior acceleration suppression control.

Furthermore, the prior acceleration suppression control block 30 has a function of calculating a target acceleration (=deceleration) $\alpha_p$ of the prior acceleration suppression control on the basis of a current position and a current speed of the host vehicle, and vehicle information of other vehicle having a deceleration cause. Specific processing contents of this prior acceleration suppression control function are described with reference to FIG. 12.

As vehicle information of other vehicle having a deceleration cause, a current position $X_A$ and a current speed $V_A$ of the other vehicle A, and a current position $X_E$ and a current speed $V_E$ of the host vehicle are acquired. Then, the deceleration $\alpha_b$ necessary to achieve the same vehicle speed at a position of the other vehicle A having a deceleration cause is calculated by the following Expression (10). Here, since the other vehicle C is excluded from the region that impacts the travel of the host vehicle, information of the other vehicle C has not been received.

[Formula 10]

$$\alpha_b = \frac{V_A^2 - V_E^2}{2(X_A - X_H)} \quad (10)$$

Next, the target acceleration $\alpha_p$ of the prior acceleration suppression control is calculated by using the following Expression (11), on the basis of the deceleration $\alpha_b$ necessary to achieve the same vehicle speed at a position of the other vehicle A having a deceleration cause, the deceleration $\alpha_s$ calculated by Expression (2), and the deceleration $\alpha_e$ at the time of engine braking calculated by Expression (3).

[Formula 11]

$$\alpha_p = \begin{cases} \alpha_e & (\alpha_b \le \alpha_c) \\ \alpha_s & (\alpha_e \le \alpha_b \le \alpha_s) \end{cases} \quad (11)$$

Here, by not making the target acceleration $\alpha_p$ of the prior acceleration suppression control smaller than the deceleration $\alpha_e$ at the time of engine braking, fuel consumption performance can be improved by not generating a braking force larger than the engine braking, that is, energy loss caused by the brake.

Here, since the prior acceleration suppression control function starts deceleration control on the basis of vehicle information of other vehicle that cannot be seen from the driver's seat of the host vehicle, the driver may feel discomfort because the acceleration is suddenly suppressed. Accordingly, it is also effective to provide a system to notify the driver of execution of the prior acceleration suppression control by using a notification means such as a speaker, a navigation system, and a head-up display, and present this information when the prior acceleration suppression control function is executed.

For example, specifically, in addition to notifying a deceleration cause of other vehicle having a deceleration cause (vehicle turning right or left, red-light deceleration, presence or absence of a stopped vehicle, stop of a bus, or the like), a distance to a position for deceleration can be displayed or presented by sound. Furthermore, a switch may be provided on the steering wheel or the like, and a switching means may be provided to switch between enabling and disabling the prior acceleration suppression control function when the driver presses the switch. This can suppress the driver from feeling discomfort.

As described above, the present embodiment has a configuration in which: other vehicle having a deceleration cause that impacts the travel of the host vehicle is determined on the basis of vehicle information corresponding to a plurality of other vehicles and being transmitted from the data center, and planned travel route information of the host vehicle; information indicating the determined other vehicle having a deceleration cause is transmitted to the data center; vehicle information of the other vehicle having a deceleration cause is preferentially acquired from the data center; and a state in which a driving force of the host vehicle is generated is controlled on the basis of the preferentially-acquired vehicle information of the other vehicle having a deceleration cause.

This makes it possible to improve fuel consumption performance by preferentially acquiring vehicle information of other vehicle having a deceleration cause in the vicinity ahead of the host vehicle, and rapidly stopping or suppressing generation of a driving force.

Example 2

Next, a second embodiment of the present invention will be described with reference to FIGS. 13 to 15. In the present embodiment, in a situation where there is no other vehicle having a deceleration cause in another adjacent lane when other vehicle having a deceleration cause occurs on a planned travel route of a host vehicle, the lane is changed to the adjacent lane in advance. This can avoid unnecessary decelerating operation, to suppress fuel consumption deterioration due to reacceleration after deceleration.

Figure 13:
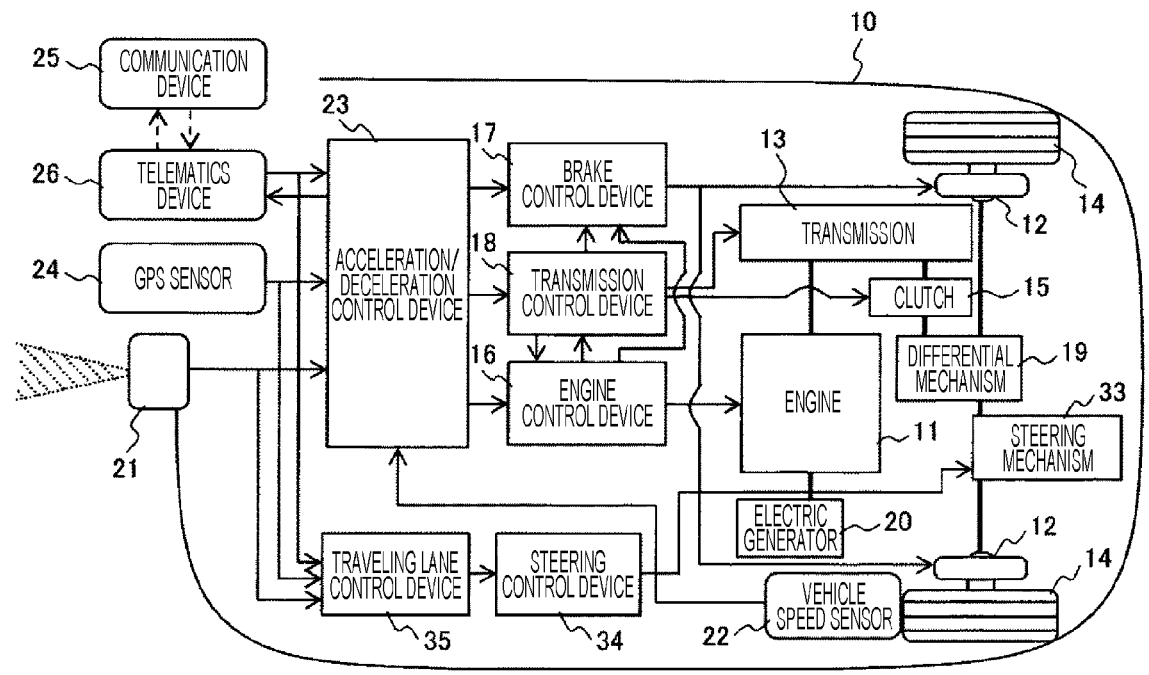
FIG. 13 is a configuration diagram showing a configuration of a vehicle provided with a travel control device according to a second embodiment of the present invention.
Figure 14:
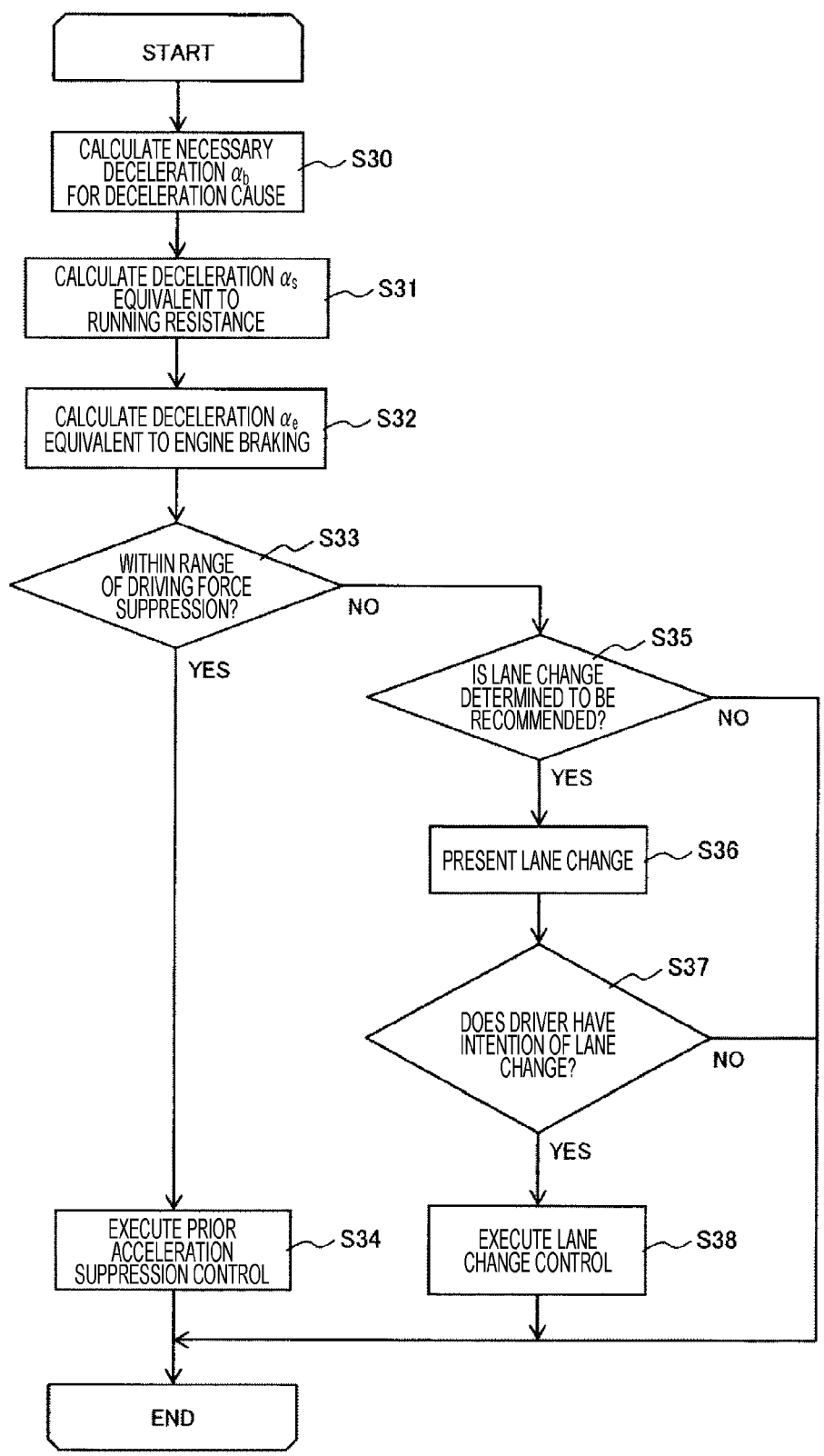
FIG. 14 is a control flow chart for explaining control contents of the travel control device according to the second embodiment of the present invention.

In FIG. 13, a driver operates a steering wheel to change a front wheel steering angle with a steering mechanism 33 of a vehicle, so that the vehicle can be moved in a lateral direction. Further, there is provided a steering control device 34 such as an electric power steering device for control of a front wheel steering angle, to assist the driver's steering.

Then, this embodiment is targeted for the vehicle that performs automatic driving, in which a traveling lane control device 35 determines a traveling position or a traveling lane, and the steering control device 34 performs control to achieve a desired front wheel steering angle on the basis of the result to automatically perform lane change.

Next, a control flow of lane change control executed by the traveling lane control device 35 will be described with reference to FIG. 14.

First, in step S30, the deceleration $\alpha_b$ necessary to achieve the same vehicle speed at a position of other vehicle having a deceleration cause is calculated by the above Expression (10). When the calculation of the deceleration $\alpha_b$ is completed, the process proceeds to step S31. In step S31, the deceleration $\alpha_s$ equivalent to a running resistance where engine driving energy does not contribute to an increase of kinetic energy is calculated by the above Expression (2). When the calculation of the deceleration $\alpha_s$ is completed, the process proceeds to step S32. In step S32, the deceleration $\alpha_e$ at the time of engine braking that does not consume fuel is calculated by the above Expression (3). When the calculation of the deceleration $\alpha_e$ is completed, the process proceeds to step S33.

In step S33, when the deceleration $\alpha_b$ necessary to achieve the same vehicle speed at a position of other vehicle having a deceleration cause is larger than the deceleration $\alpha_s$ equivalent to running resistance, in order to execute the prior acceleration suppression control function by other vehicle having a deceleration cause, it is determined to be in a region that impacts the travel of the host vehicle, and the process proceeds to step S34. Whereas, when the deceleration $\alpha_b$ necessary to achieve the same vehicle speed at the position of the deceleration-causing vehicle is smaller than the deceleration $\alpha_s$ equivalent to the running resistance, since it is not necessary to execute the prior acceleration suppression control function, it is determined to be the region that does not impact the travel of the host vehicle, and the process proceeds to step S35.

When it is determined in step S33 to be in the region that impacts the travel of the host vehicle, driving force control is performed so as to achieve the target acceleration $\alpha_p$ calculated by the above Expression (11), in step S34. This is control similar to that in Example 1.

Whereas, when it is determined in step S33 to be in the region that does not impact the travel of the host vehicle, it is determined from the vehicle information of other vehicle having a deceleration cause whether or not the host vehicle should change the lane, in step S35. Specifically, with information from a navigation system, a planned travel route of the host vehicle is acquired, and on the basis of the current traveling lane of the host vehicle and the traveling lane of the other vehicle having a deceleration cause, it is determined whether or not to change the lane. This determination method is as shown in FIG. 15.

Figure 15:
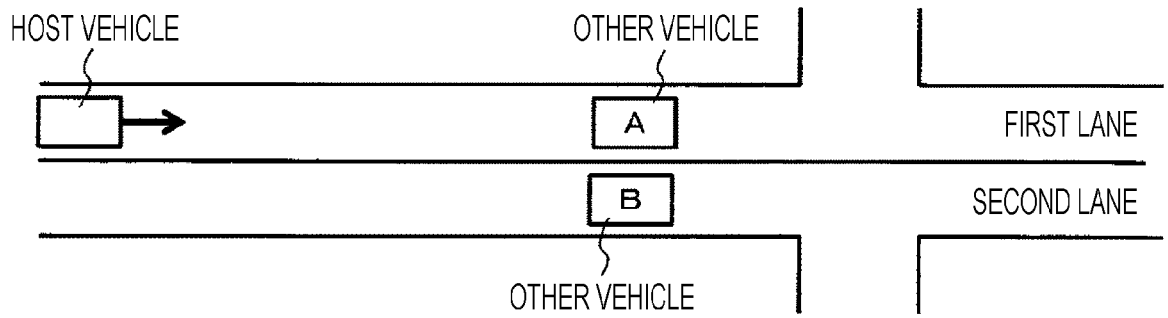
FIG. 15 is an explanatory view for explaining a method of recommendation determination of a lane change in Example 2 of the present invention.

FIG. 15 shows a current traveling lane of the host vehicle, a planned travel route of the host vehicle, a traveling lane of other vehicle having a deceleration cause, and recommendation determination of lane change under these conditions. For the traveling lane on which the vehicle having a deceleration cause is traveling, "1" is indicated when there is a deceleration cause, and "*" is indicated when there is no deceleration cause or detection is not possible. Then, as the determination result, "○" is indicated when lane change is recommended, and "−" is indicated when lane change is not recommended.

As can be seen from FIG. 15, in a case where the planned travel route of the host vehicle is straight ahead, when there is other vehicle having a deceleration cause on the current traveling lane of the host vehicle, and there is no other vehicle having a deceleration cause on other lanes, lane change is recommended. In addition, also in a case where the planned travel route of the host vehicle is turning right or left, when there is a deceleration cause on the current traveling lane, lane change is recommended. This enables lane change on the traffic flow of the vehicle, thereby enabling improvement of the drivability and also improvement of the fuel consumption performance.

Here, with regard to the traveling lane of other vehicle having a deceleration cause, when the deceleration cause is deceleration due to a right or left turn, processing is performed assuming that the deceleration cause occurs in the traveling lane of the other vehicle having a deceleration cause. Whereas, when the deceleration cause is a deceleration due to a red light, a deceleration due to the tail end of traffic jam, or the like, processing is performed assuming that the deceleration cause occurs not only in the lane but also in other lanes. This can suppress unnecessary lane changes.

Then, when the determination result is "−", the process exits to "END", while when the recommendation determination result of the lane change is "○", the process proceeds to step S36. In step S36, lane change is presented to the driver. Specifically, a lane to be changed is notified by a notification means such as a speaker or a navigation system. However, when there is other vehicle approaching from the periphery or the rear of the host vehicle at this time, the lane change is not to be notified in consideration of safety.

Next, in step S37, when it is determined from turn indicator information or the like that the driver has no intention of lane change, the process exits to "END", and when it is determined that the driver has intention of lane change, the process proceeds to step S38. In step S38, lane change control is to be performed.

Thus, in a situation where there is other vehicle having a deceleration cause on the planned travel route of the host vehicle and no other vehicle having a deceleration cause on other lanes, unnecessary deceleration control can be avoided by changing the lane in advance. As a result, the fuel required for reacceleration after deceleration can be reduced, and fuel consumption performance can be improved.

Example 3

Figure 16:
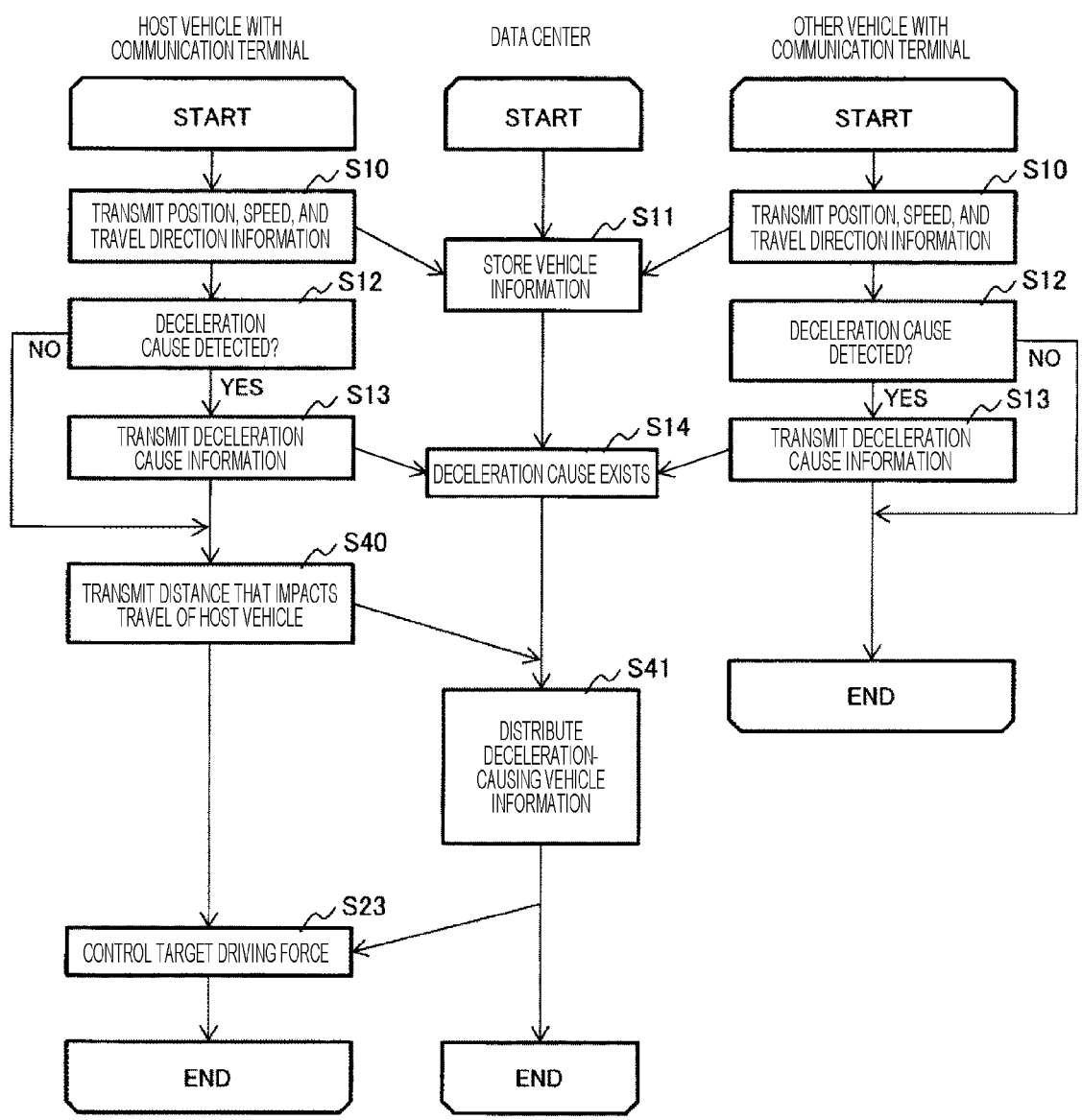
FIG. 16 is a control flow chart for explaining control contents of a travel control device according to a third embodiment of the present invention.
Figure 17A:
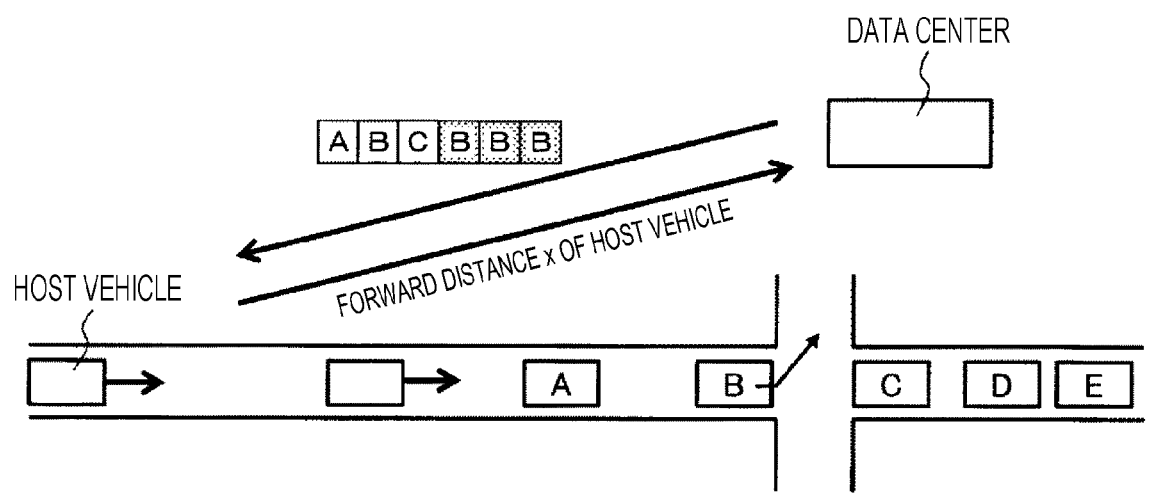
FIG. 17A is an explanatory view for explaining a communication method when other vehicle having a deceleration cause is traveling.

Next, a third embodiment of the present invention will be described with reference to FIGS. 16, 17A, and 17B. FIG. 16 shows processing contents of a host vehicle and a data center 27, and the data center 27 and other vehicle in Example 3 of the present invention. Here, since steps S10 to S14 are the same as the control steps of FIG. 2, the description will be omitted.

Then, in step S40, a forward distance x to other vehicle that impacts the travel of the host vehicle is calculated and transmitted to the data center 27. Specifically, the forward distance x (see FIG. 5) is calculated by Expression (1) on the basis of a current position of the host vehicle and a deceleration α to be recommended from the viewpoint of the current speed and fuel consumption. Here, the deceleration α to be recommended from the viewpoint of fuel consumption is calculated on the basis of any deceleration of: a deceleration $α_s$ (obtained from Expression (2)) equivalent to running resistance where engine driving energy does not contribute to an increase of kinetic energy; or a deceleration $α_e$ (obtained from Expression (3)) at the time of engine braking that does not consume fuel.

Then, the data center 27 executes the process of step S41 by using the transmitted forward distance x. In step S41, other vehicle having a deceleration cause is specified on the basis of the forward distance x that impacts the travel of the host vehicle, and vehicle information of the specified other vehicle is selected and transmitted. Thus, as shown in FIG. 17A, while the host vehicle is traveling, vehicle information pertaining to other vehicle having a deceleration cause can be transmitted at every transmission timing of the data center 27.

Figure 17B:
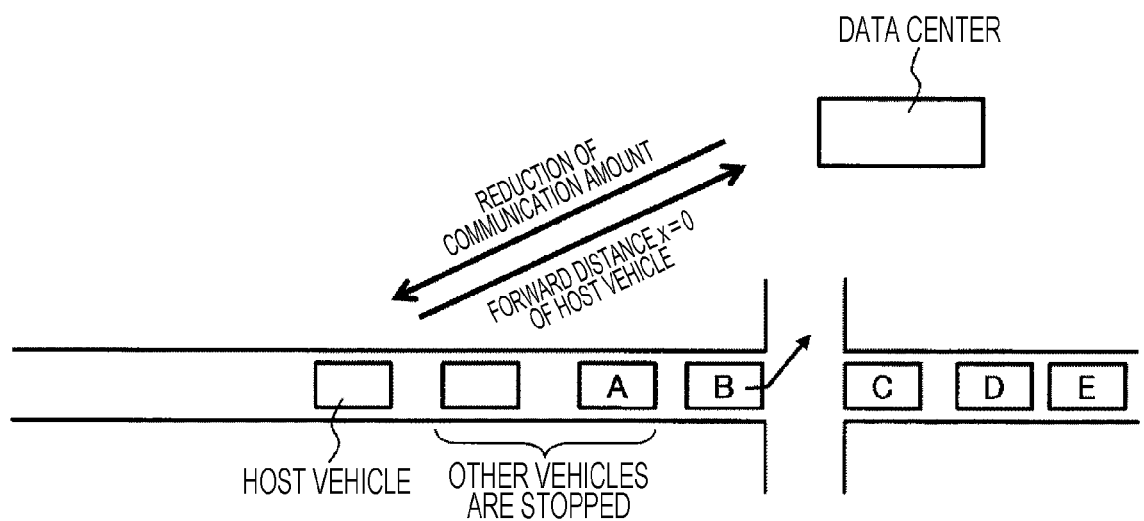
FIG. 17B is an explanatory view for explaining a communication method when other vehicle having a deceleration cause is stopped.
Figure 18:
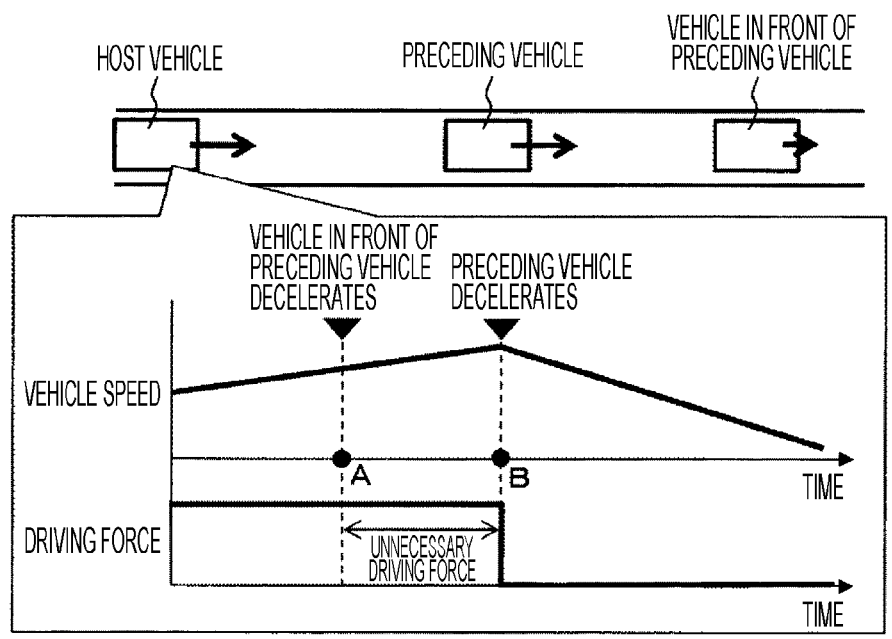
FIG. 18 is an explanatory view for explaining a conventional acceleration/deceleration control method.
Figure 19A:
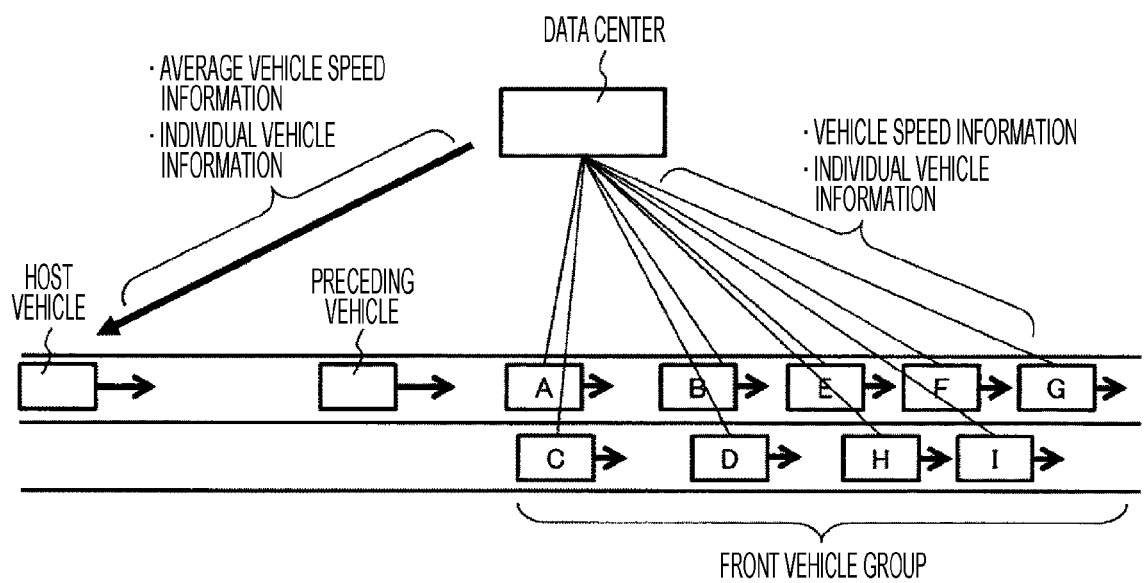
FIG. 19A is an explanatory view for explaining a conventional method of communicating with other vehicle having a deceleration cause.
Figure 19B:
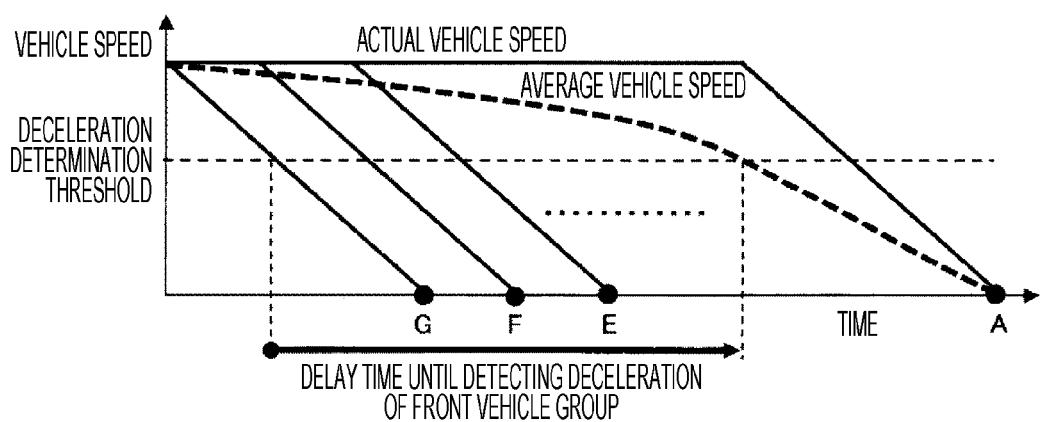
FIG. 19B is an explanatory view for explaining a problem caused by a conventional acceleration/deceleration control method.
Figure 20:
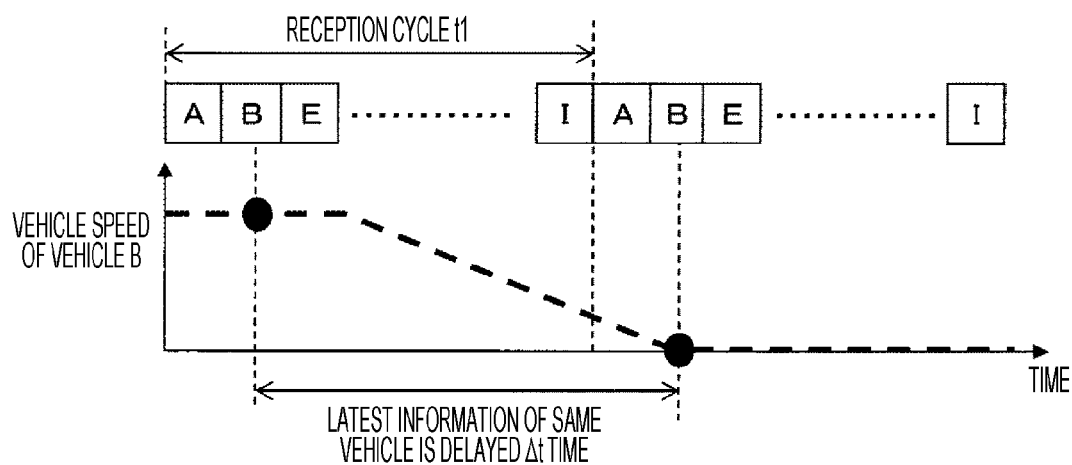
FIG. 20 is an explanatory view for explaining a communication cycle of a conventional data center and a host vehicle.

Whereas, as shown in FIG. 17B, while the host vehicle is stopped, since the forward distance x that impacts the travel of the host vehicle is "0" m, transmission of vehicle information of other vehicle having a deceleration cause can be stopped. Therefore, a communication load between the data center 27 and the host vehicle can be reduced.

Then, in step S23, the target driving force is controlled on the basis of the received vehicle information of the other vehicle having a deceleration cause. Since this control is similar to the control step shown in FIG. 2, the description is omitted.

As described above, in the present invention, other vehicle having a deceleration cause that impacts the travel of the host vehicle is determined on the basis of vehicle information corresponding to a plurality of other vehicles and being transmitted from the data center, and planned travel route information of the host vehicle; information indicating the determined other vehicle having a deceleration cause is transmitted to the data center; vehicle information of the other vehicle having a deceleration cause is preferentially acquired from the data center; and a state in which a driving force of the host vehicle is generated is controlled on the basis of the preferentially-acquired vehicle information of the other vehicle having a deceleration cause.

This makes it possible to improve fuel consumption performance by preferentially acquiring vehicle information of other vehicle having a deceleration cause in the vicinity ahead of the host vehicle, and rapidly stopping or suppressing generation of a driving force.

Note that the present invention is not limited to the above-described embodiments, but also includes various modifications.

For example, the embodiments described above have been illustrated in detail to facilitate description for easy understanding of the present invention, and are not necessarily limited to the embodiments that include all the configurations. Additionally, a part of a configuration of an embodiment may be replaced with a configuration of another embodiment, and a configuration of an embodiment may be added with a configuration of another embodiment. Moreover, a part of a configuration of each embodiment may be deleted, replaced, or added with another configuration.

REFERENCE SIGNS LIST 10 vehicle
11 engine
12 brake
13 transmission
14 wheel
15 clutch
16 engine control device
17 brake control device
18 transmission control device
19 differential mechanism
20 electric generator
21 forward recognition sensor
22 vehicle speed sensor
23 acceleration/deceleration control device
24 GPS sensor
25 communication device
26 telematics device

The invention claimed is:

1. A device for controlling a host vehicle traveling in a lane and preceded by a group of vehicles including a head vehicle and an intermediate vehicle, the device comprising:
a communication terminal disposed within the host vehicle and configured to communicate wirelessly with a data center external to the host vehicle to receive therefrom an indication of deceleration of the head vehicle;
a brake controlled by a hydraulic brake pressure controller to change a braking force of the host vehicle based on the received indication of deceleration of the head vehicle such that the host vehicle decelerates in response to deceleration of the head vehicle before the intermediate vehicle decelerates in response to the deceleration of the head vehicle, thereby reducing delay in the host vehicle deceleration response and improving fuel consumption performance of the host vehicle.

2. The device according to claim 1, further comprising:
a program storage device storing a host vehicle engine control program;
a host vehicle engine controller configured to execute the stored engine control program to adjust an amount of intake air and an amount of fuel injection into the host vehicle engine so as to cause the host vehicle engine to generate a driving force,
wherein determining the driving force of the host vehicle is based on information of the head vehicle, and
wherein, when the deceleration of the head vehicle is detected, the driving force of the host vehicle is stopped or suppressed.

3. The device according to claim 2, wherein the hydraulic brake pressure controller controls the hydraulic pressure supplied to the brake so as to press a friction body against a sliding surface of a disc that rotates with a wheel of the host vehicle whereby the driving force is stopped or suppressed.

4. The device according to claim 3, wherein:
the indication of deceleration of the head vehicle from the data center, includes information specifying the head vehicle; and
the deceleration of the host vehicle in response to deceleration of the head vehicle is calculated based at least in part on the braking force, a radius of the wheel of the host vehicle and the information specifying the head vehicle.

5. The device according to claim 4, wherein
the information includes:
a forward distance that impacts travel of the host vehicle calculated based on deceleration determined from a current speed and a current position of the head vehicle, and a current speed and a current position of the host vehicle.

6. The device according to claim 3, wherein the host vehicle receives the information of the head vehicle when the host vehicle is closer to the head vehicle that it would be under circumstances in which the information of the head vehicle has not been updated.

7. The device according to claim 2, wherein a driver is notified that generation of the driving force of the host vehicle is stopped or suppressed when the hydraulic brake pressure controller changes the braking force of the host vehicle based on the received indication of deceleration of the head vehicle.

8. The device according to claim 2, wherein the device further comprises: a switch disposed on a steering wheel of the host vehicle, the switch configured to be operable by a driver of the host vehicle to enable or disable the stopping or suppressing of the driving force of the host vehicle.

* * * * *